US012539241B2

(12) United States Patent
Stryker et al.

(10) Patent No.: US 12,539,241 B2
(45) Date of Patent: *Feb. 3, 2026

(54) PATIENT REPOSITIONING APPARATUS

(71) Applicant: Stryker Corporation, Kalamazoo, MI (US)

(72) Inventors: Martin W. Stryker, Kalamazoo, MI (US); Cory Patrick Herbst, Shelbyville, MI (US); Brian J. Tessmer, Kalamazoo, MI (US); Christopher Ryan Sweeney, Portage, MI (US); Steven D. Pikaart, Byron Center, MI (US)

(73) Assignee: Stryker Corporation, Portage, MI (US)

(*) Notice: Subject to any disclaimer, the term of this patent is extended or adjusted under 35 U.S.C. 154(b) by 13 days.

This patent is subject to a terminal disclaimer.

(21) Appl. No.: 17/359,956

(22) Filed: Jun. 28, 2021

(65) Prior Publication Data

US 2021/0322241 A1 Oct. 21, 2021

Related U.S. Application Data

(63) Continuation of application No. 16/572,181, filed on Sep. 16, 2019, now abandoned, which is a (Continued)

(51) Int. Cl.
*A61G 7/10* (2006.01)
*A61G 7/05* (2006.01)

(52) U.S. Cl.
CPC ......... *A61G 7/1044* (2013.01); *A61G 7/0524* (2016.11); *A61G 7/1001* (2013.01);
(Continued)

(58) Field of Classification Search
CPC .. A61G 7/1017; A61G 7/1026; A61G 7/1055; A61G 7/0507; A61G 7/0509;
(Continued)

(56) References Cited

U.S. PATENT DOCUMENTS 2,528,048 A 10/1950 Gilleland
2,665,432 A 1/1954 Butler
(Continued)

OTHER PUBLICATIONS

International Search Report for PCT/US2016/032394, the international counterpart to U.S. Appl. No. 15/154,158.
(Continued)

*Primary Examiner* — Matthew Troutman
*Assistant Examiner* — Morgan J Mcclure
(74) *Attorney, Agent, or Firm* — Warner Norcross + Judd LLP

(57) ABSTRACT

A patient handling system comprising a patient support apparatus having a patient support surface, a component, and a force generating device inducing movement or assisting in movement of the component, and a sheet for covering at least a portion of the patient support surface, and the sheet coupled to the component wherein when the force generating device is operated to induce movement or assist in movement of the component, the movement induces the sheet to move relative to the patient support surface.

20 Claims, 19 Drawing Sheets

Related U.S. Application Data continuation of application No. 15/154,158, filed on May 13, 2016, now Pat. No. 10,413,468.

(60) Provisional application No. 62/161,340, filed on May 14, 2015.

(52) U.S. Cl.
CPC .......... *A61G 7/1057* (2013.01); *A61G 7/0507* (2013.01); *A61G 7/051* (2016.11); *A61G 7/0518* (2016.11); *A61G 7/1017* (2013.01)

(58) Field of Classification Search
CPC .... A61G 7/051; A61G 7/1001; A61G 7/1019; A61G 7/1044; A61G 7/1057; A61G 7/0513; A61G 7/0515; A61G 7/0516; A61G 7/0518; A61G 7/0519; A61G 7/0524
See application file for complete search history.

(56) References Cited

U.S. PATENT DOCUMENTS

| | | | | | |
|---|---|---|---|---|---|
| 2,710,975 | A | | 6/1955 | Stoen et al. | |
| 2,733,452 | A | | 2/1956 | Tanney | |
| 2,812,524 | A | | 11/1957 | Pruitt | |
| 3,317,928 | A | | 5/1967 | Root | |
| 3,597,774 | A | | 8/1971 | Warren | |
| 3,757,359 | A | | 9/1973 | Stellman | |
| 3,829,914 | A | | 8/1974 | Treat | |
| 3,905,055 | A | * | 9/1975 | Blair | A61G 7/1015 5/85.1 |
| 3,924,281 | A | * | 12/1975 | Gibbs | A61G 7/1015 5/88.1 |
| 4,194,253 | A | | 3/1980 | Ullven | |
| 4,262,375 | A | * | 4/1981 | Lilienthal | A61G 7/1055 5/81.1 HS |
| 4,327,453 | A | | 5/1982 | Sefton | |
| 4,726,082 | A | | 2/1988 | DiMatteo et al. | |
| 4,747,170 | A | | 5/1988 | Knouse | |
| 4,776,047 | A | | 10/1988 | DiMatteo | |
| 4,796,313 | A | | 1/1989 | DiMatteo et al. | |
| 4,799,273 | A | | 1/1989 | Elze | |
| 4,821,352 | A | | 4/1989 | DiMatteo et al. | |
| 4,843,665 | A | * | 7/1989 | Cockel | A61G 7/0005 5/81.1 R |
| 4,868,938 | A | | 9/1989 | Knouse | |
| 4,872,226 | A | | 10/1989 | Lonardo | |
| 4,908,889 | A | | 3/1990 | Lonardo | |
| 5,018,225 | A | * | 5/1991 | Fergni | A61G 7/0573 5/607 |
| 5,020,171 | A | | 6/1991 | DiMatteo et al. | |
| 5,038,424 | A | | 8/1991 | Carter et al. | |
| 5,054,140 | A | * | 10/1991 | Bingham | A61G 7/0573 5/600 |
| 5,155,874 | A | | 10/1992 | Kershaw | |
| 5,404,602 | A | * | 4/1995 | Kondo | A47C 21/022 24/514 |
| 5,454,126 | A | * | 10/1995 | Foster | A61G 7/00 5/624 |
| 5,524,304 | A | | 6/1996 | Shutes | |
| 5,539,941 | A | | 7/1996 | Fuller | |
| 5,544,371 | A | * | 8/1996 | Fuller | A61G 7/1015 5/85.1 |
| 5,544,376 | A | * | 8/1996 | Fromson | A47C 20/041 5/915 |
| 5,680,661 | A | * | 10/1997 | Foster | A61G 7/0513 5/604 |
| 5,692,272 | A | | 12/1997 | Woods | |
| 5,697,109 | A | | 12/1997 | Hodgetts | |
| 5,715,548 | A | * | 2/1998 | Weismiller | A61G 7/052 5/624 |
| 5,819,339 | A | | 10/1998 | Hodgetts | |
| D402,434 | S | | 12/1998 | Votel | |
| 6,282,734 | B1 | | 9/2001 | Holberg | |
| 6,341,393 | B1 | * | 1/2002 | Votel | A61G 7/1019 5/81.1 HS |
| 6,393,636 | B1 | * | 5/2002 | Wheeler | A61G 7/1032 5/81.1 R |
| 6,507,963 | B2 | | 1/2003 | Hodgetts | |
| 6,662,388 | B2 | * | 12/2003 | Friel | A61G 7/1046 5/81.1 R |
| 6,772,456 | B2 | * | 8/2004 | Votel | A61G 7/1026 5/81.1 R |
| 6,834,402 | B2 | | 12/2004 | Hanson et al. | |
| 7,000,268 | B2 | | 2/2006 | Johnson | |
| 7,062,803 | B2 | | 6/2006 | McMahan | |
| 7,111,338 | B2 | * | 9/2006 | Faux | A61G 7/1019 5/81.1 R |
| 7,114,203 | B2 | | 10/2006 | Lloyd et al. | |
| 7,219,377 | B2 | | 5/2007 | McMahan | |
| 7,231,680 | B1 | * | 6/2007 | Hafford | A47C 21/024 5/505.1 |
| 7,290,299 | B2 | | 11/2007 | Votel | |
| 7,293,303 | B2 | | 11/2007 | Worrell | |
| 7,305,725 | B2 | | 12/2007 | Burton | |
| 7,340,784 | B2 | | 3/2008 | Stryker et al. | |
| 7,487,558 | B2 | | 2/2009 | Risk, Jr. et al. | |
| 7,725,964 | B2 | | 6/2010 | Minning et al. | |
| 8,104,118 | B2 | * | 1/2012 | Derenne | A61G 7/0513 5/430 |
| 8,726,431 | B2 | * | 5/2014 | Sverdlik | A61G 7/1015 5/85.1 |
| 8,745,779 | B2 | | 6/2014 | Roberg | |
| 8,776,286 | B1 | * | 7/2014 | Edgerton | A61G 7/0516 5/430 |
| 9,248,063 | B2 | * | 2/2016 | Wang | A61G 7/1003 |
| 9,295,598 | B2 | * | 3/2016 | Roussy | A61G 7/0514 |
| 10,137,045 | B2 | | 11/2018 | Hillenbrand, II et al. | |
| 2002/0029417 | A1 | * | 3/2002 | Walker | A61G 7/1023 5/81.1 R |
| 2002/0083521 | A1 | * | 7/2002 | Sverdlik | A61G 7/1055 5/81.1 R |
| 2002/0083522 | A1 | * | 7/2002 | Sverdlik | A61G 7/1055 5/81.1 R |
| 2003/0074732 | A1 | * | 4/2003 | Hanson | A61G 7/08 5/81.1 R |
| 2003/0093860 | A1 | * | 5/2003 | Kramer | A61G 7/05 5/425 |
| 2003/0110560 | A1 | * | 6/2003 | Friel | A61G 7/1015 5/81.1 R |
| 2004/0177443 | A1 | * | 9/2004 | Simmonds | A61G 7/05769 5/428 |
| 2005/0150044 | A1 | * | 7/2005 | Votel | A61G 7/0507 5/81.1 R |
| 2005/0217023 | A1 | * | 10/2005 | Tally | A61G 7/1044 5/81.1 R |
| 2005/0229321 | A1 | * | 10/2005 | Phillips | G01G 19/445 5/713 |
| 2005/0235415 | A1 | | 10/2005 | Pedersen et al. | |
| 2006/0021142 | A1 | * | 2/2006 | Hornbach | A61G 7/0509 5/613 |
| 2006/0059624 | A1 | * | 3/2006 | Poulos | A61G 7/002 5/618 |
| 2006/0090258 | A1 | * | 5/2006 | Stryker | A61G 7/1026 5/81.1 R |
| 2006/0090259 | A1 | * | 5/2006 | Castonguay | A61G 7/0509 5/430 |
| 2006/0090260 | A1 | * | 5/2006 | Stryker | A61G 7/0509 5/430 |
| 2006/0117481 | A1 | * | 6/2006 | Stryker | A61G 7/0514 5/430 |
| 2007/0000049 | A1 | | 1/2007 | White et al. | |
| 2007/0094790 | A1 | | 5/2007 | Bloomquist, Jr. | |
| 2007/0157385 | A1 | * | 7/2007 | Lemire | A61G 7/08 5/618 |
| 2007/0220671 | A1 | | 9/2007 | Vanderheiden et al. | |
| 2007/0240260 | A1 | * | 10/2007 | White | A61G 7/1013 5/81.1 R |
| 2009/0139028 | A1 | * | 6/2009 | Morin | A61G 7/0507 5/430 |

(56) References Cited

U.S. PATENT DOCUMENTS

| | | | | |
|---|---|---|---|---|
| 2012/0047653 | A1* | 3/2012 | Metz | A61G 7/0514 5/428 |
| 2012/0144581 | A1* | 6/2012 | Roberg | A61G 7/1026 5/81.1 C |
| 2014/0259389 | A1* | 9/2014 | Hillenbrand | A61G 7/1026 5/81.1 HS |
| 2014/0317843 | A1* | 10/2014 | Martin | A61G 7/1055 5/88.1 |
| 2014/0352058 | A1* | 12/2014 | Sverdlik | A61G 7/1044 5/81.1 HS |
| 2015/0250322 | A1* | 9/2015 | Guyvoronskiy | A47C 17/38 5/136 |
| 2015/0250668 | A1* | 9/2015 | De La Place | E04H 12/18 212/347 |
| 2016/0089291 | A1* | 3/2016 | Tilk | A61G 7/1046 5/81.1 HS |
| 2016/0128610 | A1* | 5/2016 | Kostic | A61G 7/018 5/613 |
| 2016/0193095 | A1* | 7/2016 | Roussy | A61G 7/0512 5/616 |

OTHER PUBLICATIONS

International Written Opinion for PCT/US2016/032394, the international counterpart to U.S. Appl. No. 15/154,158.

* cited by examiner

PATIENT REPOSITIONING APPARATUS

This is a continuation application of U.S. patent application Ser. No. 16/572,181, filed Sep. 16, 2019, entitled PATIENT REPOSITIONING APPARATUS, which is a continuation application of U.S. patent application Ser. No. 15/154,158, filed May 13, 2016, Martin W. Stryker, et al., entitled, PATIENT REPOSITIONING APPARATUS, now U.S. Pat. No. 10,413,468, which in turn claims the benefit of U.S. Provisional App. Ser. No. 62/161,340, filed May 14, 2015, entitled PATIENT REPOSITIONING APPARATUS, which are incorporated by reference herein in their entireties.

TECHNICAL FIELD AND BACKGROUND OF THE INVENTION

The healthcare industry has endured a long history of problems with caregiver injuries, especially back injuries. One of the many activities that can cause these injuries includes patient lifting, transferring, and repositioning.

In an attempt to remedy these problems, some states and institutions have implemented a no lift policy. Often times, these policies dictate the use of powered mechanical devices to move and/or reposition patients. Despite the existence of numerous powered and non-powered mechanical devices to help caregivers move patients, back injuries continue.

Patients may require repositioning for a number of reasons. For example, for comfort, many patients are placed or place themselves in a position with the backrest of the bed raised. This is also a common position for patients with respiratory conditions, where the backrest is placed at a 30° angle to facilitate breathing. As a result, gravity has a tendency to cause a patient to migrate down the backrest and toward the foot end of the bed. Therefore, caregivers often have to move patients back up the backrest toward the head end of the bed, which is commonly referred to as "boosting" a patient. For ICU patients, this may occur multiple times each day.

Current boosting methods include placing the deck of the bed in a horizontal position (e.g. lowering the backrest if raised) and positioning a caregiver on each side of the bed, who then grasp the existing sheet to manually move the patient to the head end of the bed using a sliding motion. Thereafter, the backrest can then be returned to its raised position. As noted, this process can be repeated over and over again during the course of a day, especially for ICU patients.

The mechanical boosting systems that currently exist include overhead hoists that are external to the bed or winching devices that are mounted at the head end of the bed, which engage sheet and then pull the sheet towards the head end of the bed.

Overhead hoists require separate handling, tracking, and storing and are, therefore, not ideal to use. While some of the winching devices have been incorporated into beds, they tend to operate the same way that caregivers operate in that they slide the patient across the bed support surface, thereby potentially exposing the patient's skin to shear forces. For patients that have been on a bed for an extended period of time, or for patients with fragile skin subject to developing pressure ulcers, these shear forces may increase the risk of injury.

SUMMARY OF THE INVENTION

Accordingly, a patient repositioning apparatus is provided that can reduce shear forces on the patient's skin when the patient is being repositioned. Further, the patient repositioning apparatus may be configured to be incorporated into a patient support apparatus, such as a bed, stretcher, cot, table, or chair, or the like, so that it may be moved from a stowed position to a deployed position for use and then returned to its stowed position.

In one embodiment, a patient handling system includes a patient support apparatus having a patient support surface, a component, and a force generating device inducing movement or assisting in movement of the component. The system further includes a sheet for covering at least a portion of the patient support surface. The sheet is configured to be coupled to the component wherein when the force generating device is operated to induce movement or assist in movement of the component, the movement of the component induces the sheet to move relative to the patient support surface.

In one aspect, the patient support comprises a bed. For example, the component may comprise a rail, such as a side rail, and the force generating device comprising a spring for assisting in moving the rail. A suitable spring may include a gas spring.

In yet another aspect, when the rail comprises a side rail, the side rail includes an engagement structure for releasably coupling the sheet to the side rail. For example, the engagement structure may comprise a clamp or anchor.

In another embodiment, a patient handling system includes a patient support apparatus having a patient support surface, a component, and a device inducing movement of the patient support surface relative to the component. The system further includes a sheet for covering at least a portion of the patient support surface. When the sheet is coupled to the component and when the force generating device is operable to induce movement or assist in movement of the patient support surface relative to the component, the movement induces the sheet to move relative to the patient support surface.

In one aspect, the patient support comprises a bed. For example the patient support apparatus may include a mattress for forming the patient support surface. In addition, the bed includes a mattress support, with the force generating device comprising a motor for raising the mattress support relative to the component.

In one aspect, the component comprises a base of the patient support apparatus, including a wheeled base.

In another aspect, the bed includes a headboard, and the sheet is coupled to the component through the headboard.

In yet another aspect, the sheet may be coupled to the component via a tether.

In yet further aspects, the mattress support supports a guide to direct the tether in a path from the sheet to the component. For example, the guide may comprise a pulley or roller.

In another aspect, the tether is coupled to the sheet via a clamp. Optionally, the sheet may be coupled to the component via a pair of tethers.

Accordingly to yet another embodiment, a method of moving a patient supported on a patient support apparatus that includes a sheet overlying at least a portion of the patient support surface of the patient support apparatus and includes a component movable relative to the patient support surface. The method includes coupling the sheet to the component and moving the component, with the moving inducing movement in the sheet to thereby move the patient relative to the patient support surface.

In one aspect, moving the component includes moving the component using a powered force producing device or an assist force producing device.

In another aspect, moving the component includes raising the component relative to the patient support surface, with the raising including lifting at least a portion of the sheet relative to the patient support surface.

In another aspect, moving the component includes translating the component relative to the patient support surface, wherein the translation translates the sheet across the patient support surface.

In a further aspect, moving further includes raising the component relative to the patient support surface, with the raising including lifting at least a portion of the sheet relative to the patient support surface.

For example, raising lifts at least a portion of the sheet relative to the patient support surface before translating the sheet across the patient support surface.

In yet another aspect, moving the component includes moving the component using a powered force producing device.

In another embodiment, a method of moving a patient supported on a patient support apparatus is provided. The patient support apparatus includes a component, a patient support surface, and a sheet with a head end overlying at least a portion of the patient support surface. In addition, the patient support surface is movable relative to the component. The method includes coupling the head end of the sheet to the component, and moving the patient support surface relative to the component, wherein the moving induces movement in the sheet relative to the patient support surface to thereby move the patient relative to the patient support surface.

In one aspect, moving the component includes moving the component using a powered force producing device, such as a motor.

In another aspect, moving the component includes raising the patient support surface relative to the component.

According to yet another embodiment, a method of moving a patient supported on a patient support apparatus is provided. The method includes reducing the patient's weight applied to the patient support apparatus at least in the region of the patient's center of gravity, such as the patient's sacral region, and sliding the patient across the patient support apparatus after the weight is reduced to thereby reduce at least some of the shear forces on the patient's skin.

In one aspect, reducing the weight includes lifting the patient at or near the patient's sacral region.

In a further aspect, lifting includes lifting the patient with a component of the patient support apparatus. For example, lifting may include lifting the patient with a powered component of the patient support apparatus or a spring assisted component of the patient support apparatus.

Before the embodiments of the invention are explained in greater detail, it is to be understood that the invention is not limited to the details of operation or to the details of construction and the arrangement of the components set forth in the following description or illustrated in the drawings. The invention may be implemented in various other embodiments and practiced or carried out in alternative ways not expressly disclosed herein. Also, it is to be understood that the phraseology and terminology used herein are for the purpose of description and should not be regarded as limiting. The use of "including" and "comprising" and variations thereof is meant to encompass the items listed thereafter and equivalents thereof as well as additional items and equivalents thereof. Further, enumeration may be used in the description of various embodiments. Unless otherwise expressly stated, the use of enumeration should not be construed as limiting the invention to any specific order or number of components. Nor should the use of enumeration be construed as excluding from the scope of the invention any additional steps or components that might be combined with or into the enumerated steps or components.

DETAILED DESCRIPTION OF THE DRAWINGS

FIG. 6 is a fragmentary enlarged view of the mounting arrangement of the side rail in

Figure 7:
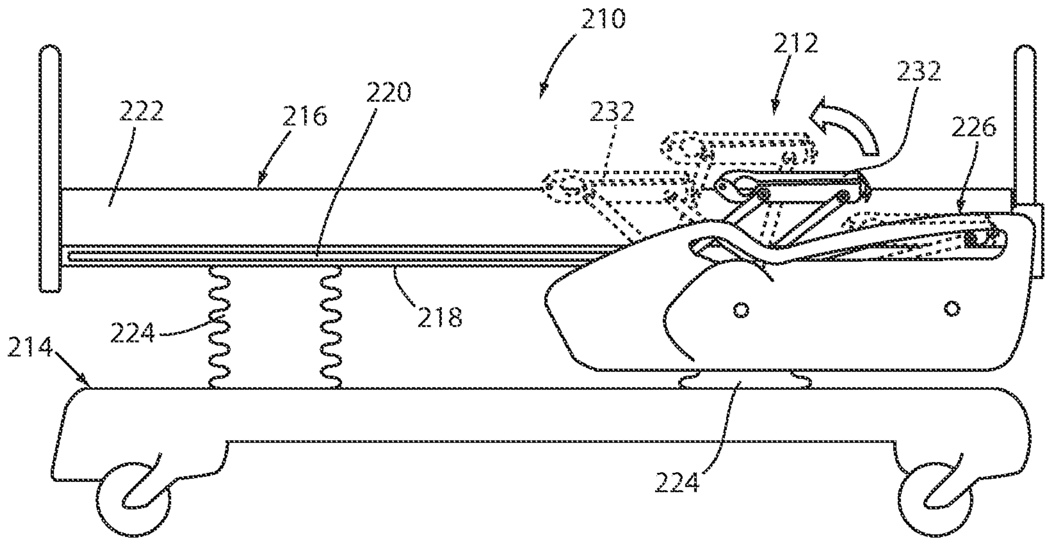
Figure 7A:
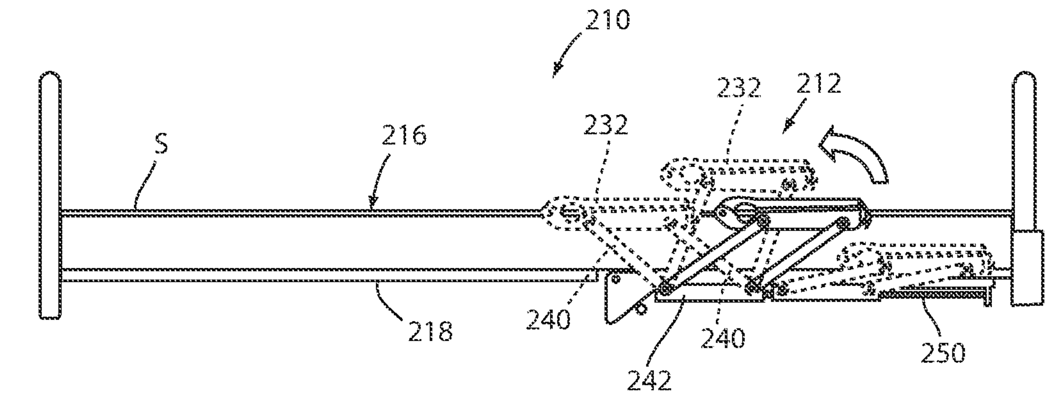
Figure 8:
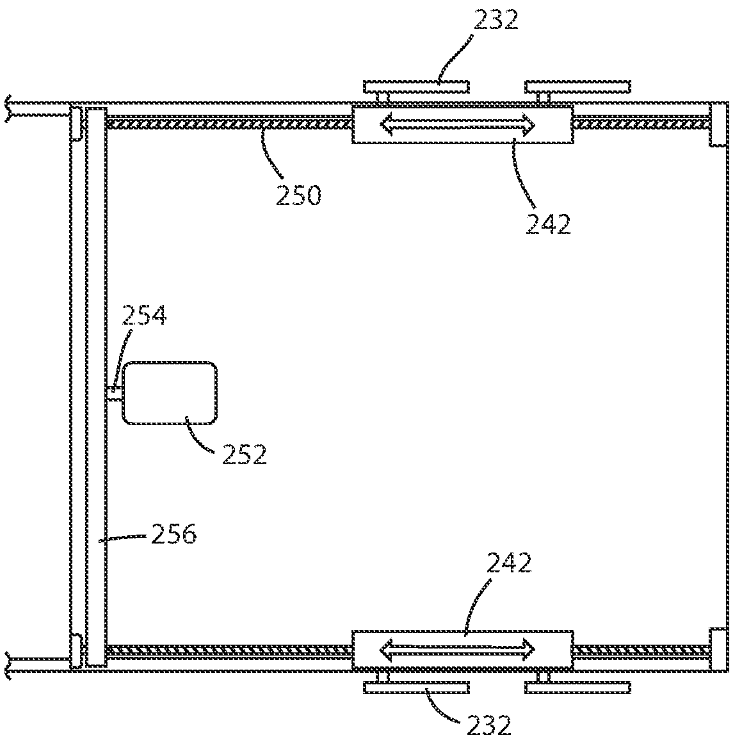
Figure 9:
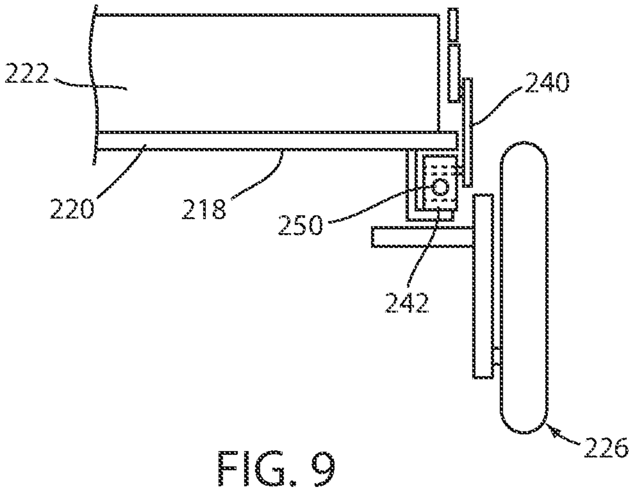
Figure 10:
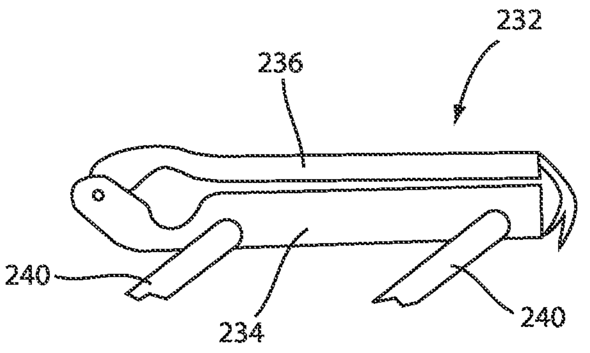
Figure 11:
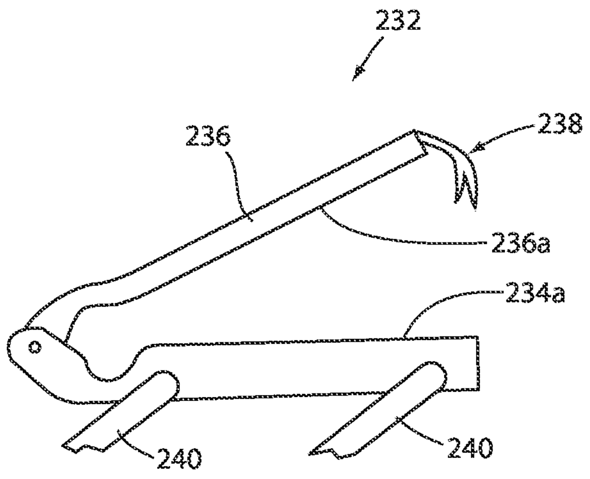
Figure 12:
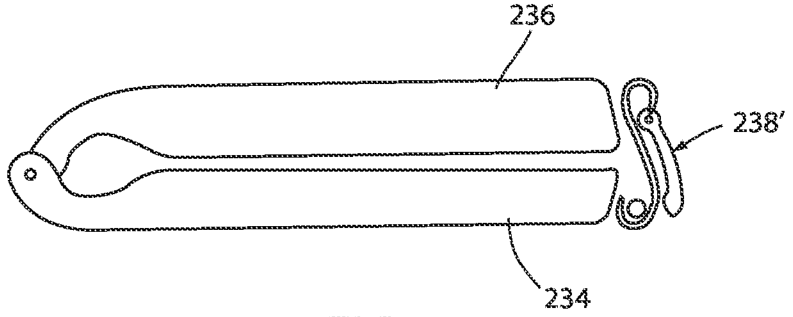
Figure 13:
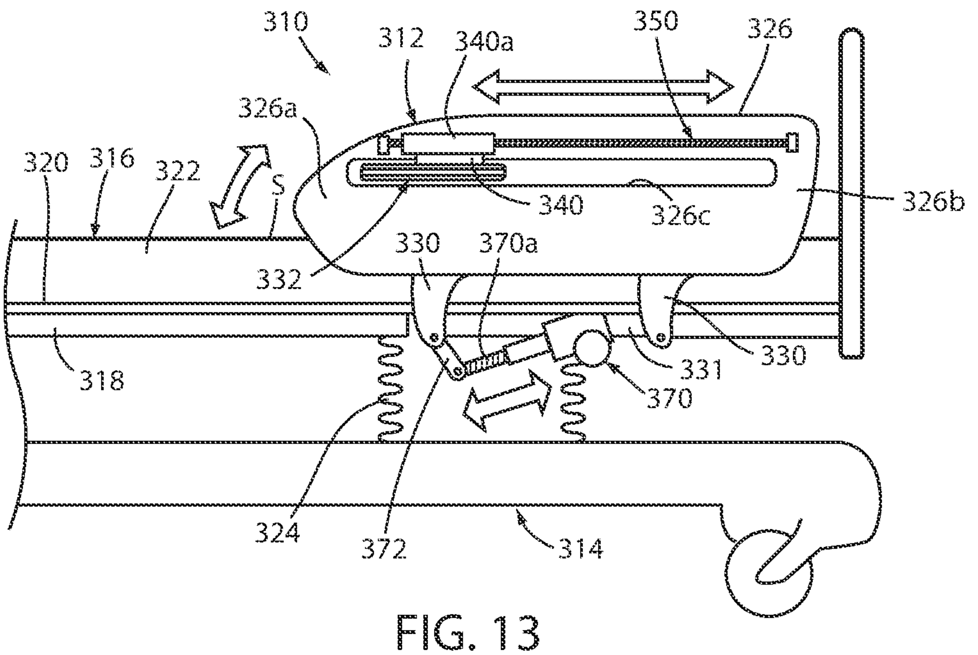
Figure 14:
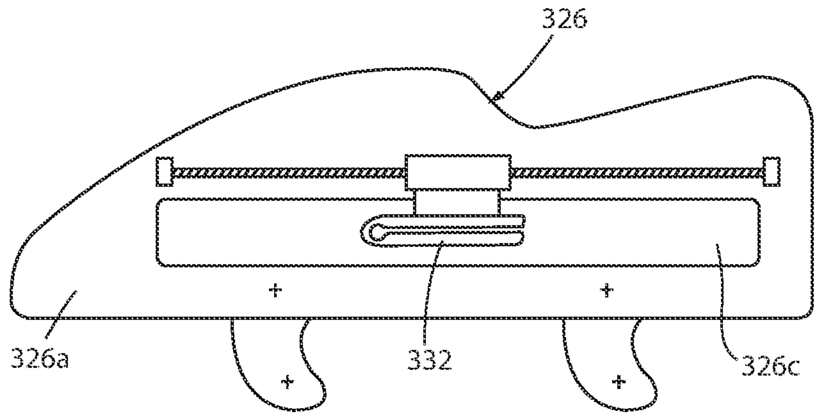
Figure 15:
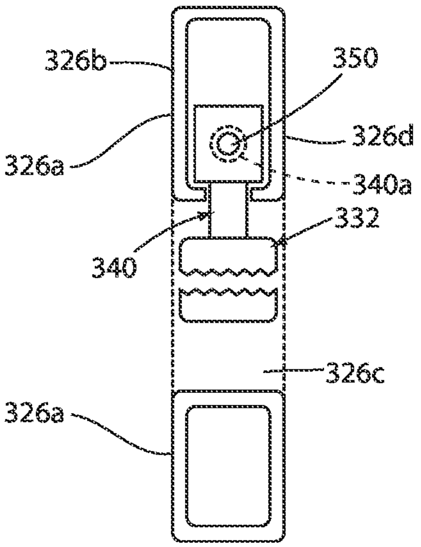
Figure 16:
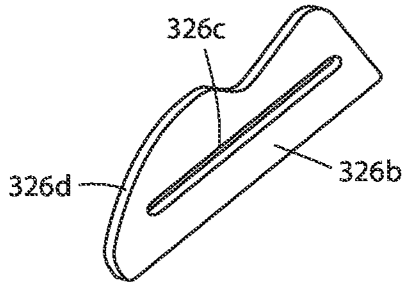
Figure 17:
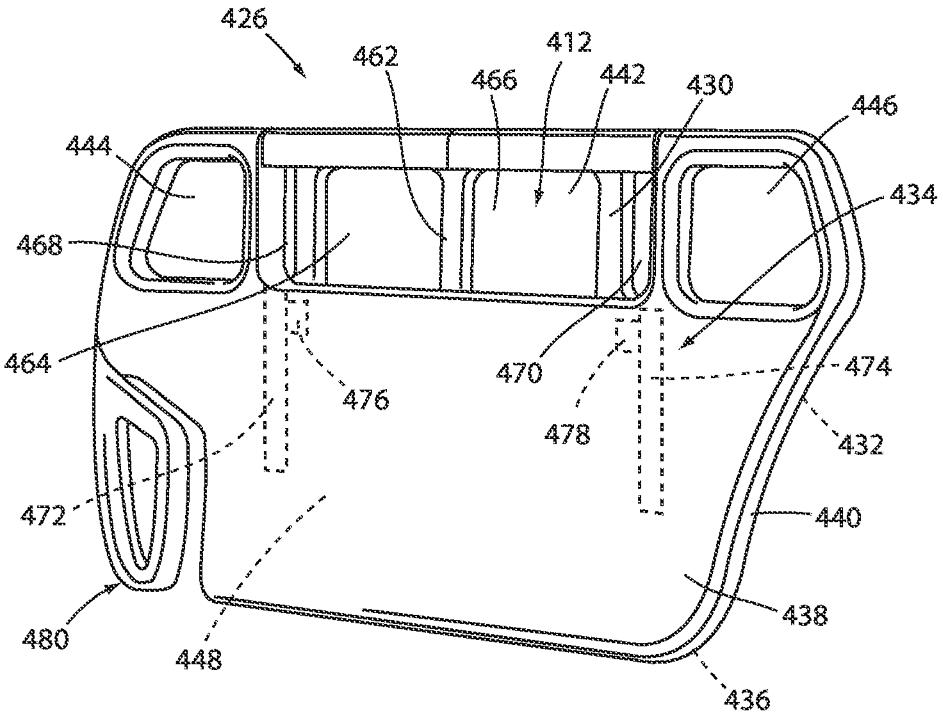
Figure 17A:
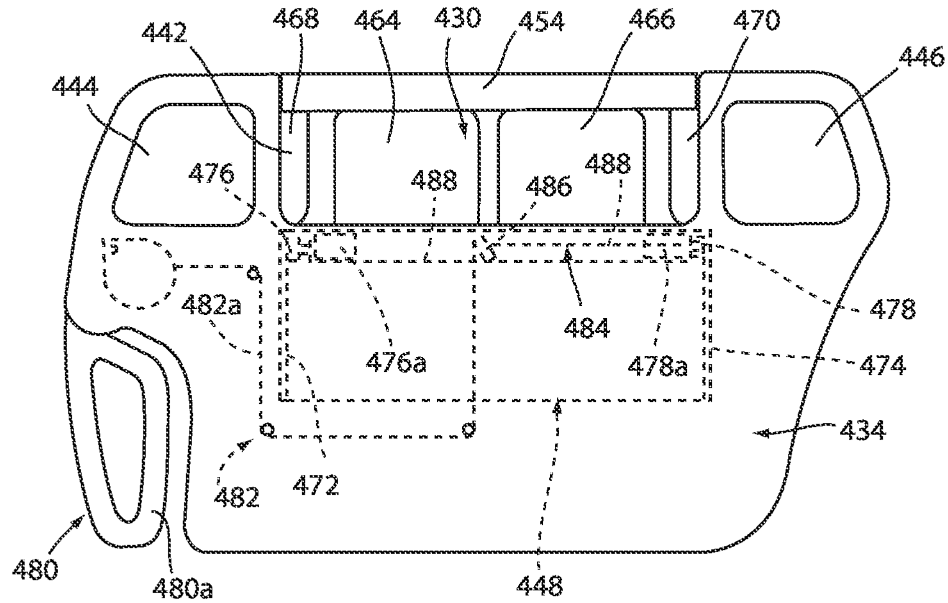
Figure 18:
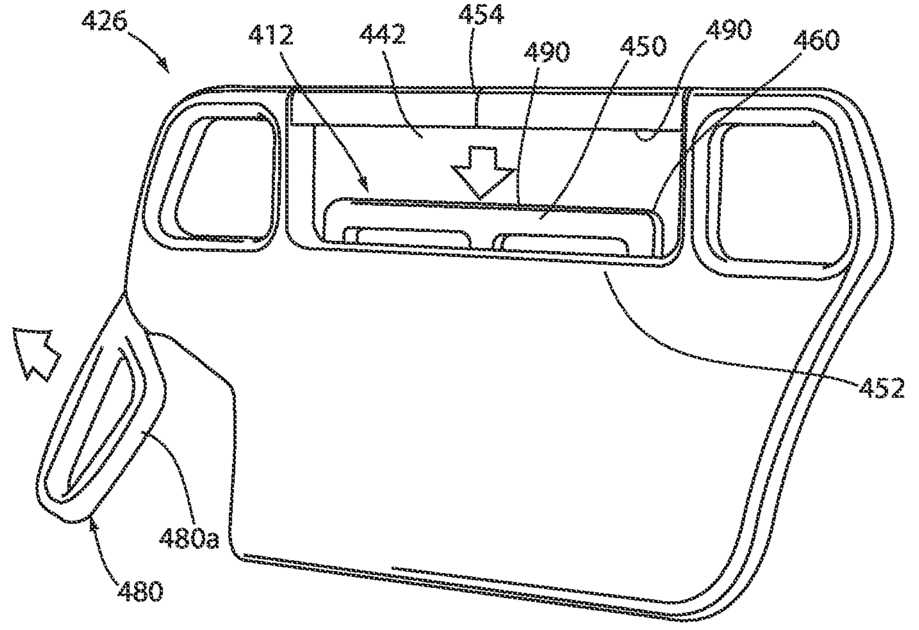
Figure 19:
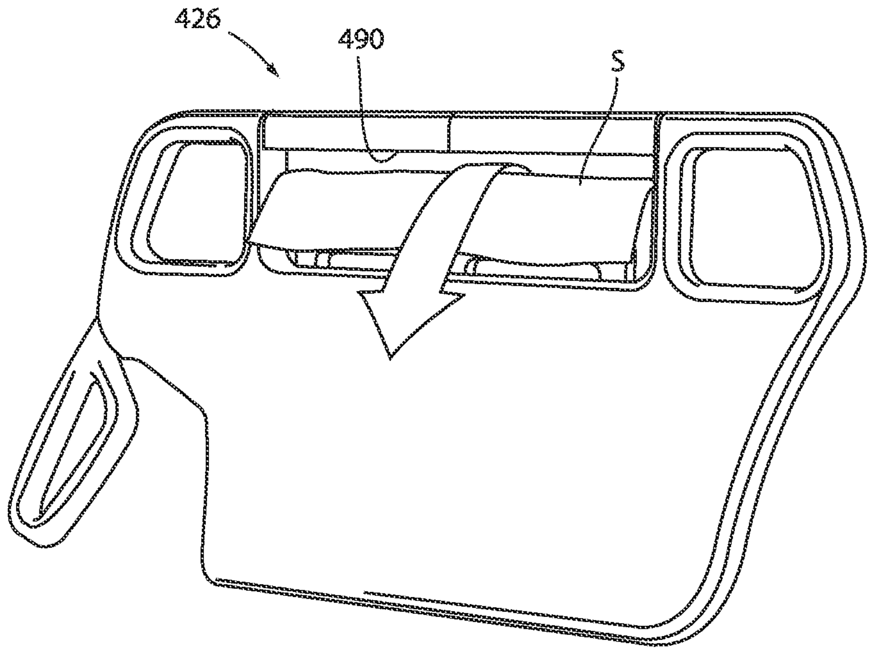
Figure 20:
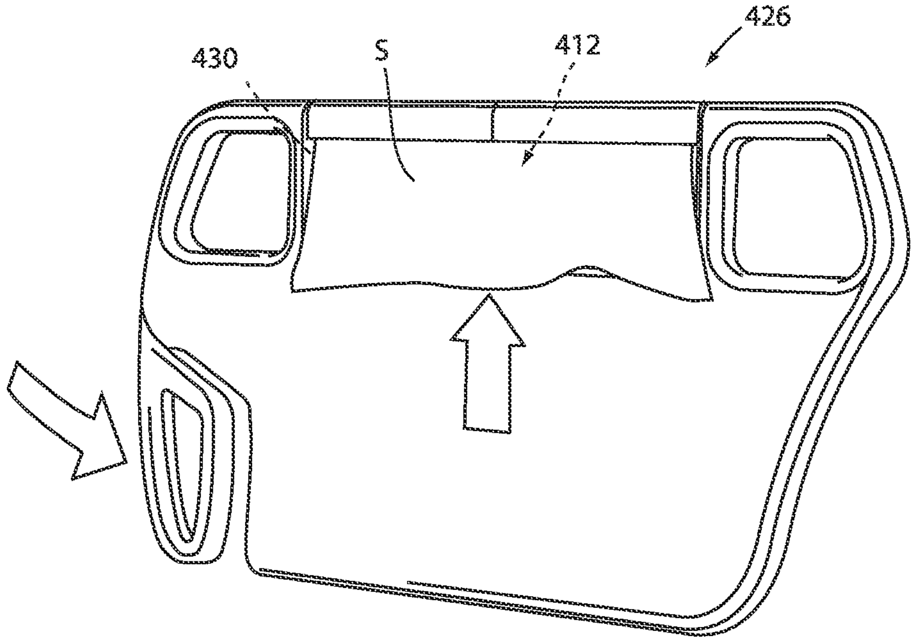
Figure 21:
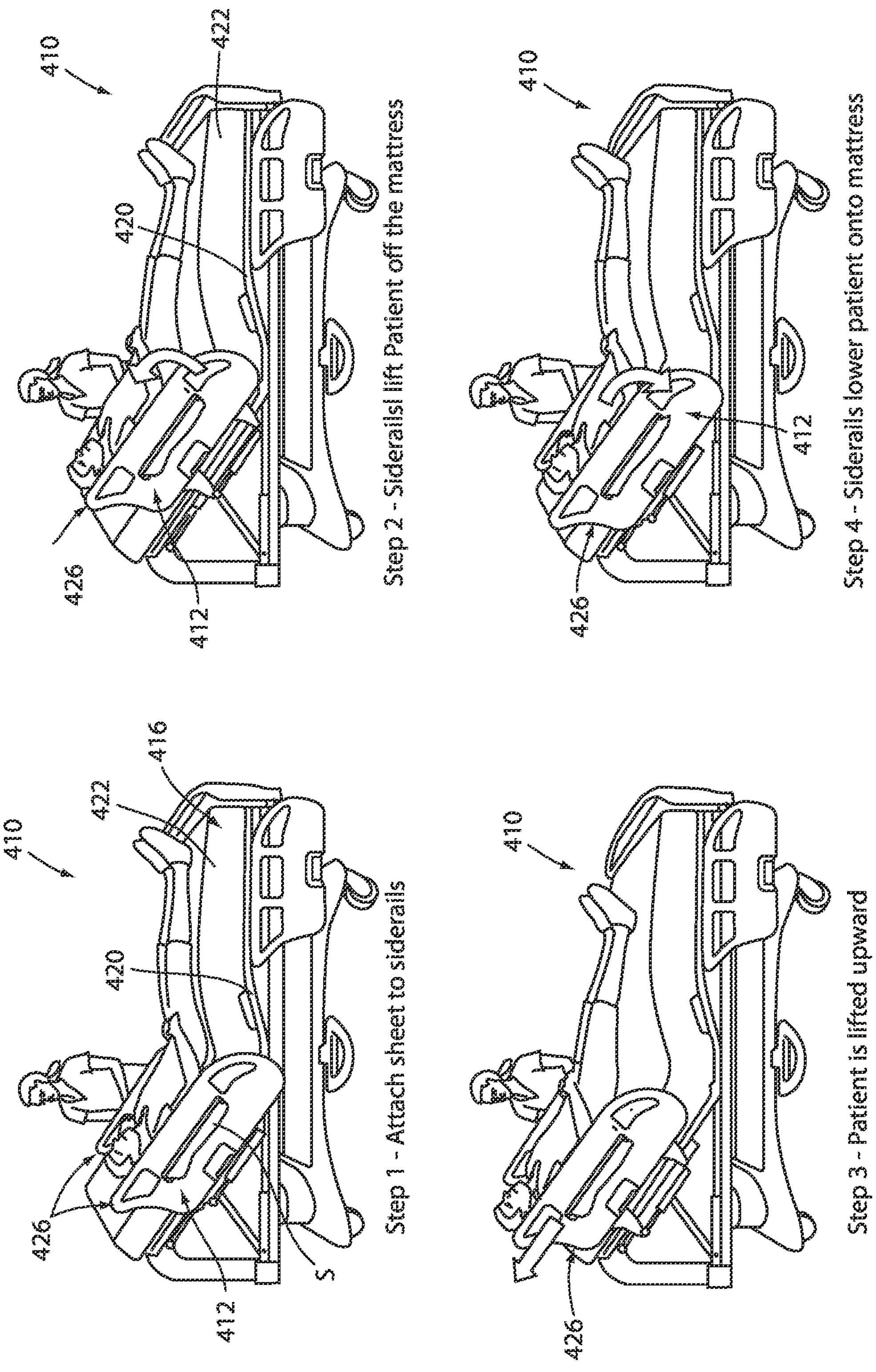
Figure 22:
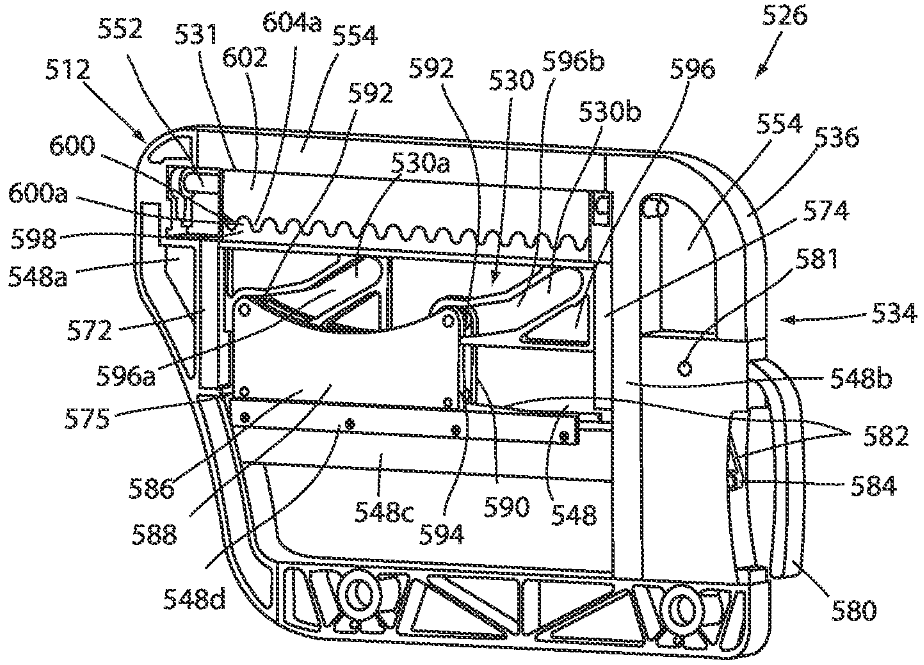
Figure 23:
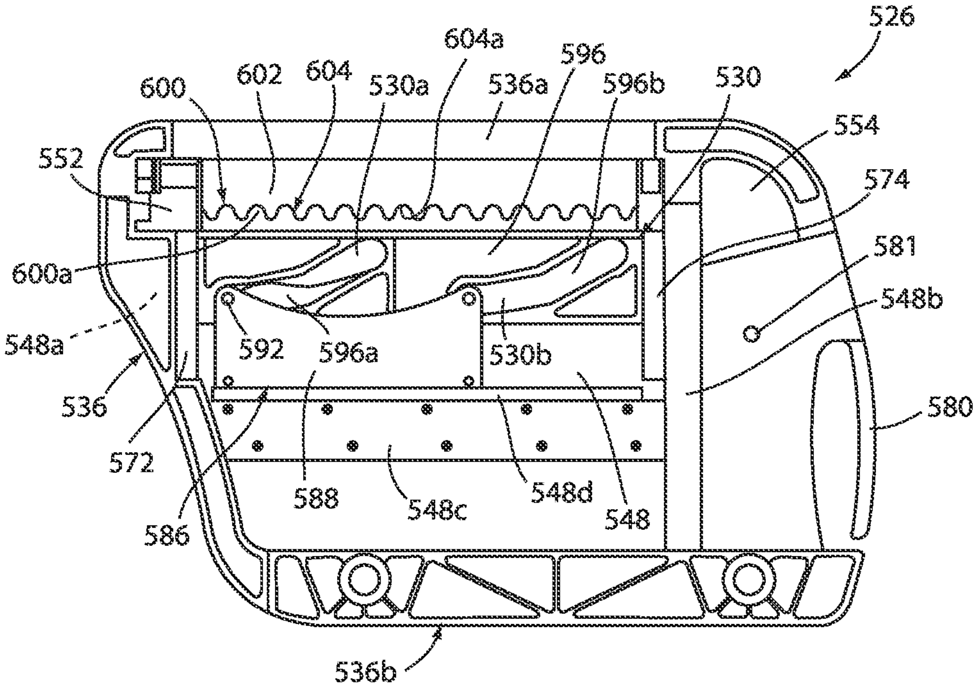
Figure 24:
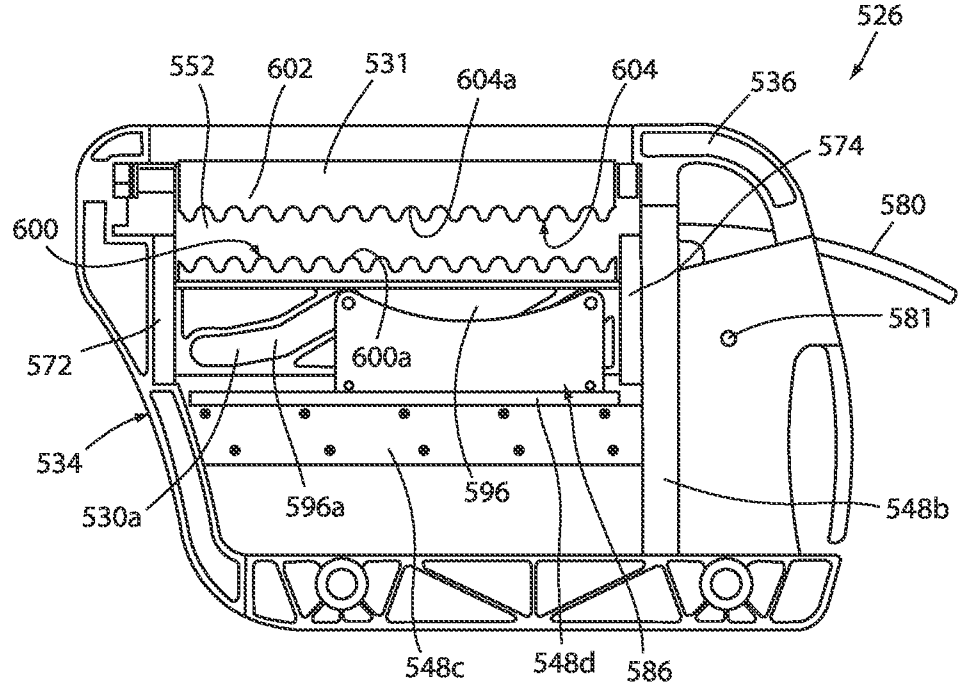
Figure 24A:
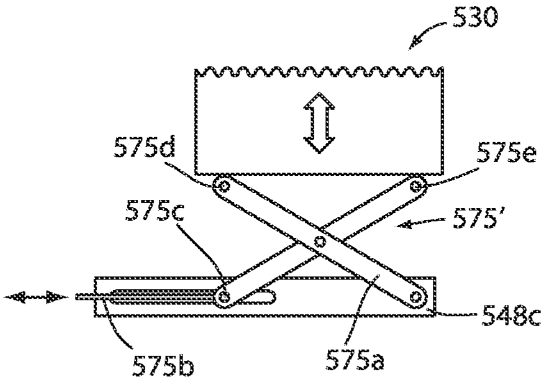
Figure 24B:
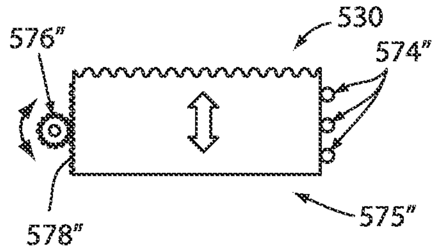
Figure 24C:
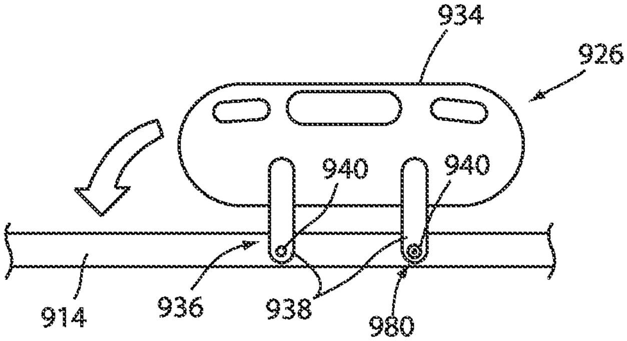
Figure 24D:
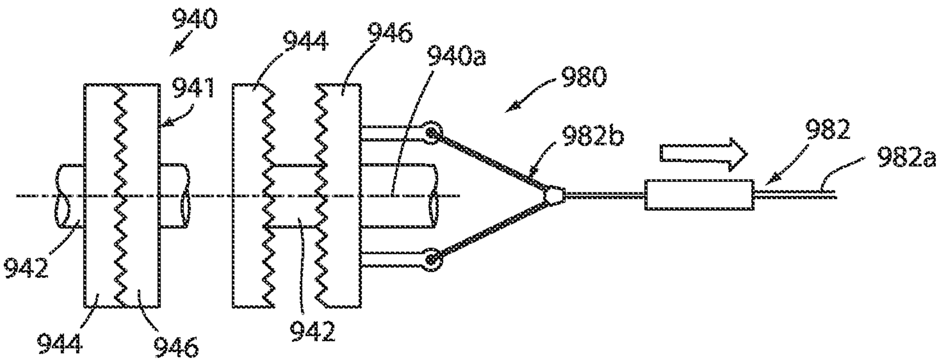
Figure 24E:
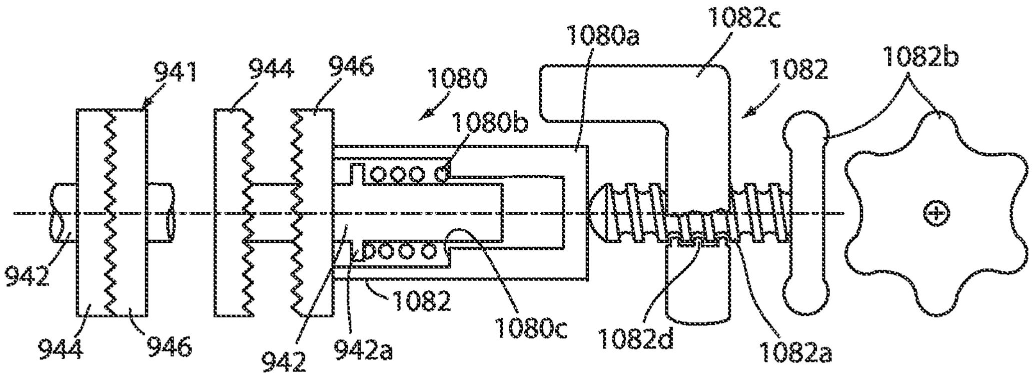
Figure 24F:
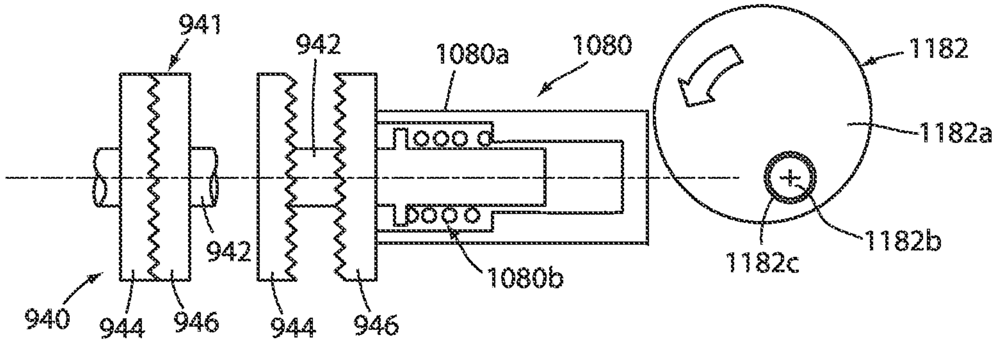
Figure 25:
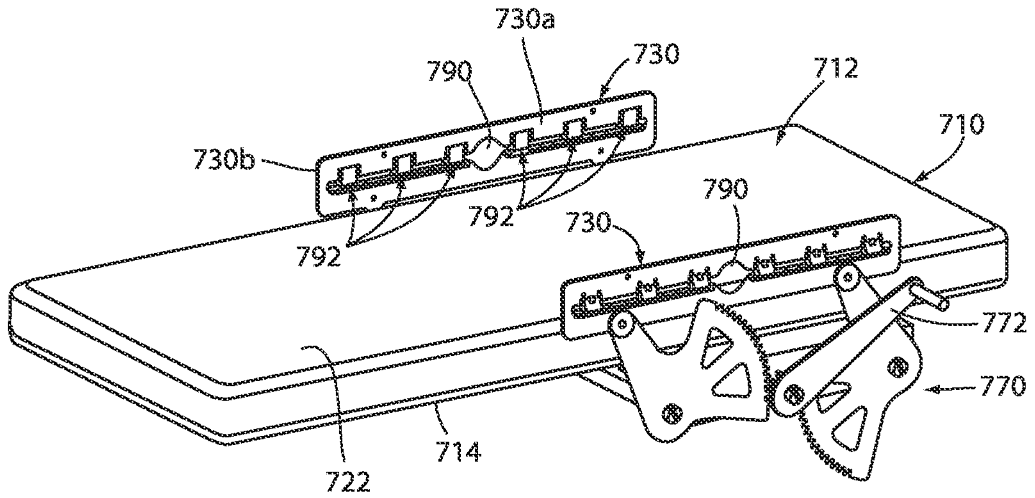
Figure 26:
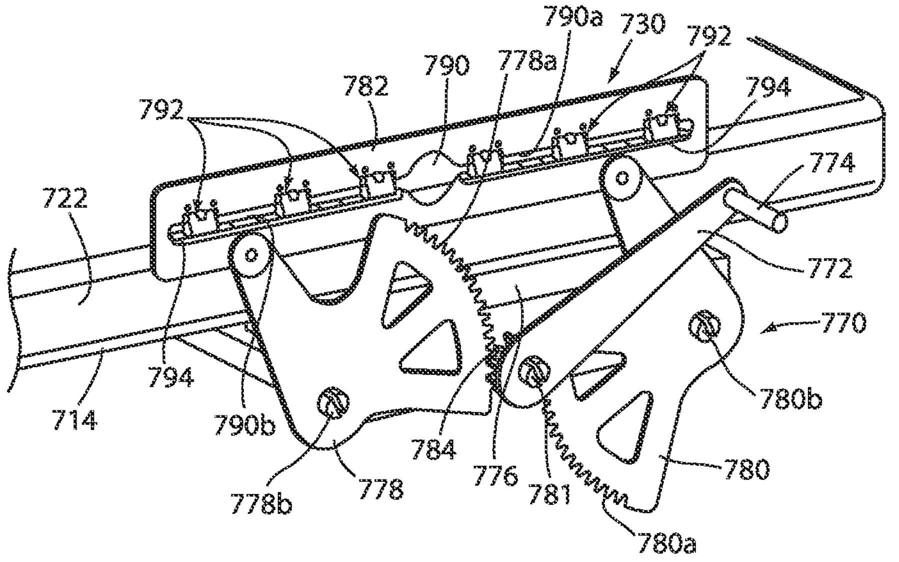
Figure 27:
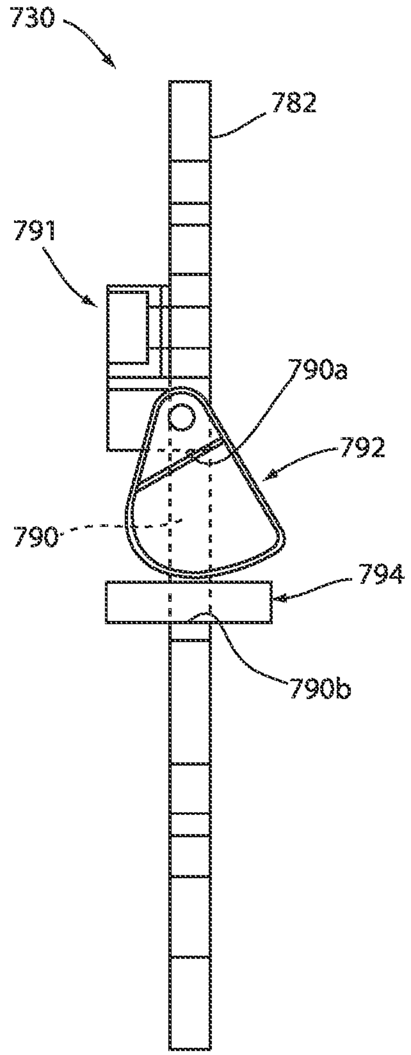
Figure 28:
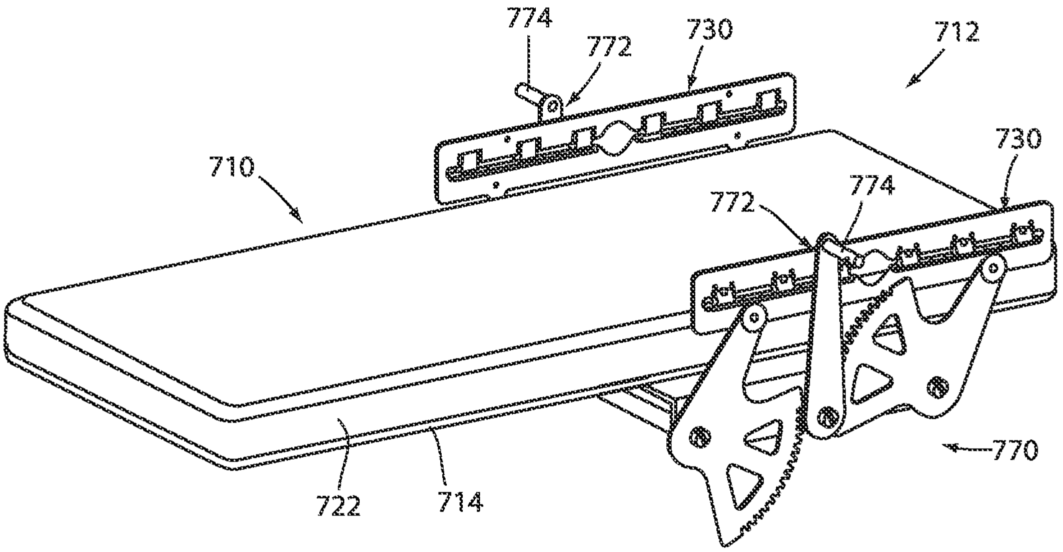
Figure 29:
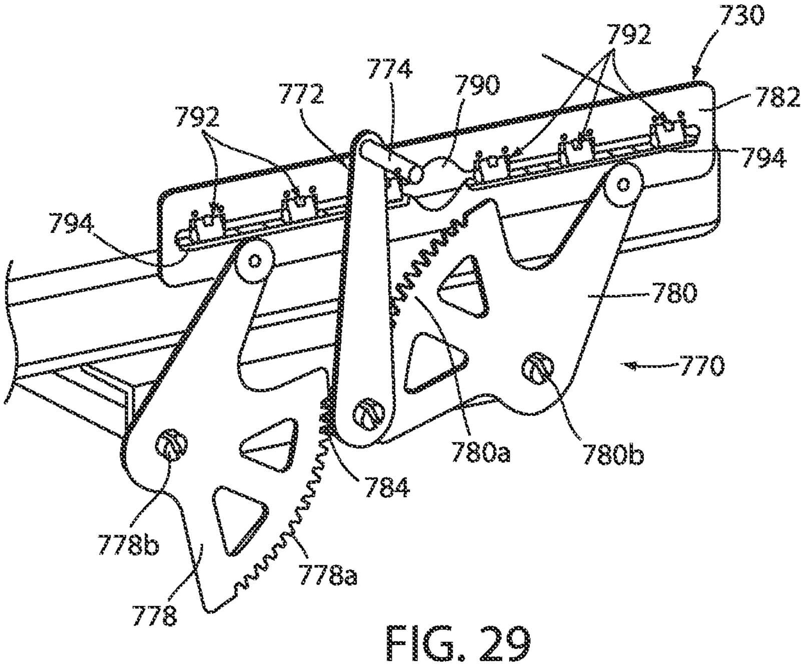

FIG. 4;

FIG. 7 is a side elevation view of yet another embodiment of a patient support apparatus incorporating a patient repositioning apparatus;

FIG. 7A is a similar view to FIG. 7 with the side rail removed for clarity;

FIG. 8 is a fragmentary plan view of the patient support apparatus of FIG. 7;

FIG. 9 is an enlarged partial fragmentary view of the mounting arrangement of the side rail;

FIG. 10 is a fragmentary view of a clamp of the patient repositioning apparatus of FIG. 9 illustrating the clamp in a closed position;

FIG. 11 is a similar view to FIG. 10 illustrating the clamp in an open position;

FIG. 12 is another embodiment of a clamp of the patient repositioning apparatus of FIG. 7;

FIG. 13 is a fragmentary side elevation view of another embodiment of a patient support apparatus incorporating a patient repositioning apparatus;

FIG. 14 is a side elevation view of the side rail of FIG. 13;

FIG. 15 is a cross-section taken through the side rail of FIG. 14;

FIG. 16 is a perspective view of the side rail of FIG. 13 where the patient repositioning apparatus is mounted inside the side rail;

FIG. 17 is a perspective view of another embodiment of a side rail incorporating a patient repositioning apparatus;

FIG. 17A is a front elevation view of the side rail of FIG. 17 illustrating a drive assembly and a release mechanism to release the drive assembly;

FIG. 18 is a similar view to FIG. 17 with the sheet engaging portion of the patient repositioning apparatus in a lowered position;

FIG. 19 is a similar view to FIG. 18 illustrating a sheet extended through the side rail over the sheet engaging portion;

FIG. 20 is similar to FIG. 19 illustrating the sheet engaging portion being moved to a raised position to thereby engage and clamp the sheet;

FIG. 21 illustrates the steps of boosting a patient using the side rail and the patient repositioning apparatus;

FIG. 22 is a perspective fragmentary view of another embodiment of a side rail incorporating a patient repositioning apparatus;

FIG. 23 is an elevation view of the side rail of FIG. 22 with the sheet engaging portion of the patient repositioning apparatus shown in the engaged and clamping position;

FIG. 24 is a similar view to FIG. 23 showing the sheet engaging portion moved to a lowered, disengaged position;

FIG. 24A is a fragmentary side elevation view illustrating another embodiment of an actuator assembly or driver for moving the frame;

FIG. 24B is a fragmentary side elevation view illustrating another embodiment of an actuator assembly for moving the frame;

FIG. 24C is a side elevation of a side rail incorporating a release mechanism for releasing the side rail from a raised position to a lowered position;

FIG. 24D is an enlarged view of one embodiment of a release mechanism for releasing the side rail from a raised position to a lowered position;

FIG. 24E is an enlarged view of another embodiment of a release mechanism for releasing the side rail from a raised position to a lowered position;

FIG. 24F is an enlarged view of yet another embodiment of a release mechanism for releasing the side rail from a raised position to a lowered position;

FIG. 25 is a perspective of another embodiment of a patient repositioning apparatus shown in a starting position prior to boosting;

FIG. 26 is an enlarged perspective view of one side of the patient repositioning apparatus of FIG. 25;

FIG. 27 is a side elevation view of the patient repositioning apparatus of FIGS. 25 and 26;

FIG. 28 is another perspective view of the patient repositioning apparatus of FIG. 25 illustrating the patient positioning apparatus in an ending or boosted position; and FIG. 29 is an enlarged perspective view of one side of the patient repositioning apparatus of FIG. 28.

DETAILED DESCRIPTION OF THE PREFERRED EMBODIMENTS

Figure 1:
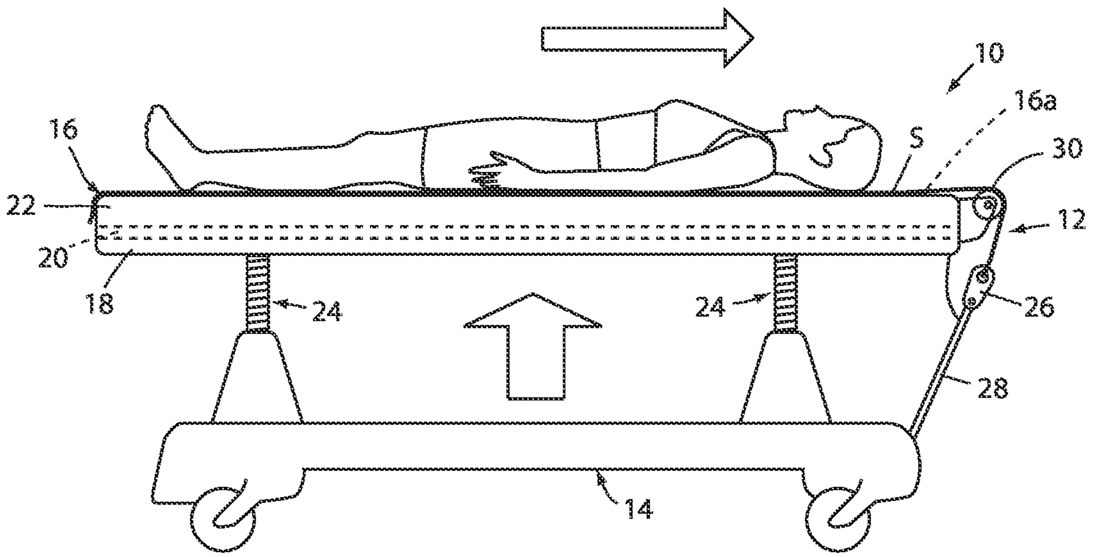
FIG. 1 is a side elevation view of a patient support apparatus incorporating a patient repositioning apparatus.

Referring to FIG. 1, the numeral 10 generally designates a patient support apparatus. As will be more fully described below, patient support apparatus 10 incorporates a patient repositioning apparatus 12 that facilitates boosting of a patient—in other words, moving the patient up towards the head end of the patient support apparatus—while reducing the strain on a caregiver. Patient support apparatus 10 may take on a number of different forms including a bed, such as a hospital bed, a stretcher, a cot, an operating room table, or a chair, or any other structure used to support a patient in a health care setting or home care setting or the like.

Patient support apparatus 10 includes a base 14 and a patient support surface 16. Patient support surface 16 may be formed by a frame 18 and an articulable deck 20, which supports a pad or mattress 22. Frame 18 is supported on base 14 by lift mechanisms 24, which are configured to raise and lower patient support surface 16 relative to base 14. A number of different suitable lift mechanisms may be used, including, for example, the lift mechanisms described in U.S. Pat. Nos. 5,063,624; 5,343,581; 6,822,571; 7,055,195; 7,836,531; and 8,006,332, which are commonly owned by Stryker Corporation of Kalamazoo, Michigan and which are incorporated by reference herein in their entireties.

Referring again to FIG. 1, patient repositioning apparatus 12 is configured to engage a sheet or a pad S (herein after reference will be made to sheet S) placed on patient support surface 16 to selectively pull on sheet S to boost a patient supported thereon. As will be described in more detail, patient repositioning apparatus 12 is configured to couple sheet S to a component of patient support apparatus 10 so that when the component is moved relative to the patient support surface, the component induces the sheet to move.

In the illustrated embodiment, patient repositioning apparatus 12 includes at least one clamping device, such as a sheet clamp 26, and at least one tether 28, which is anchored to base 14. A suitable sheet clamp is described in U.S. Pat. Nos. 7,591,030 and 8,156,582, which are commonly owned by Stryker Corporation of Kalamazoo Michigan and incorporated by reference herein in their entireties. Thus, when lift mechanisms 24 raise patient support surface 16 relative to base 14, tether 28 will pull on clamp 26, and clamp 26 in turn will pull on sheet S to move the patient in the direction indicated by the arrow in FIG. 1. To selectively operate patient repositioning apparatus 12, tether 28 or clamp 26 may include a release to release the sheet so that the sheet is only pulled when the patient needs boosting. Accordingly, patient repositioning apparatus 12 itself may be a non-powered device, but may selectively leverage the power of lift mechanisms 24 of patient support apparatus 10. As described in the referenced patents and published applications, the lift mechanisms may include linear actuators, such as electric motors or pneumatic or hydraulic cylinders, or the like. Thus, patient repositioning apparatus 12 is able to leverage the force of the force generating device (or devices) that raise the patient support surface relative to the base to move the sheet and the patient supported thereon.

To facilitate guiding sheet S along the path of tether 28, patient repositioning apparatus 12 may include a guide 30, for example, a roller or pulley mounted at the head end of patient support surface 16. Optionally, guide 30 is mounted in a fixed arrangement, for example, to the deck 20 or frame 18. Further, guide 30 may be mounted so that its upper guide surface is generally parallel with upper surface 16*a* of patient support surface 16. Alternately, guide 30 may be positioned so that it or at least its guide surface is above upper surface 16*a* of patient support surface 16 so that when tether 28 is anchored to base 14 and lift mechanisms 24 are actuated, guide 30 directs tether 28 to lift sheet S off patient support surface 16 to thereby reduce the shear forces on a patient's skin being boosted. For example, guide or guides 30 may be mounted at an upper end of the headboard (described below), including at the upper edge of the headboard, or on a wall positioned behind the headboard of patient support apparatus 10. Furthermore, the position of the guide or guides may be adjustable.

Figure 2:
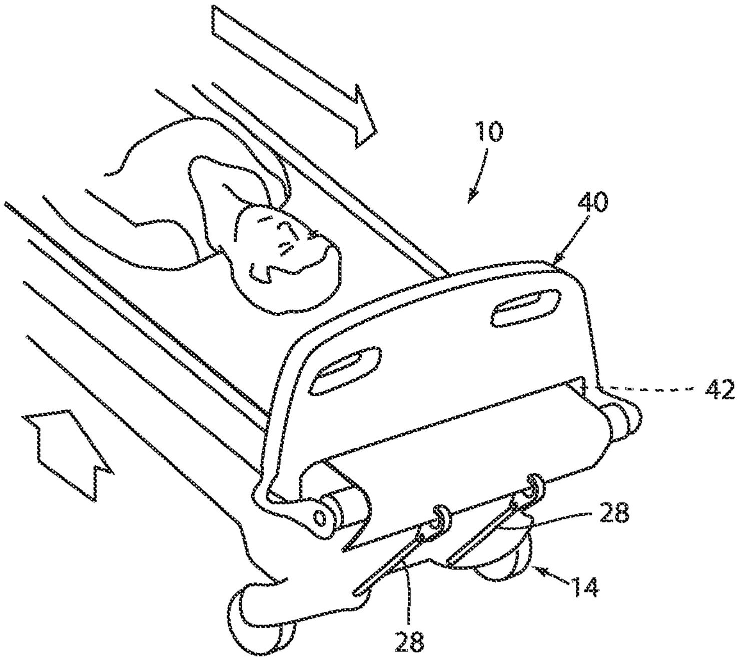
FIG. 2 is a perspective view from the head end of the patient support apparatus of FIG. 1.
Figure 2A:
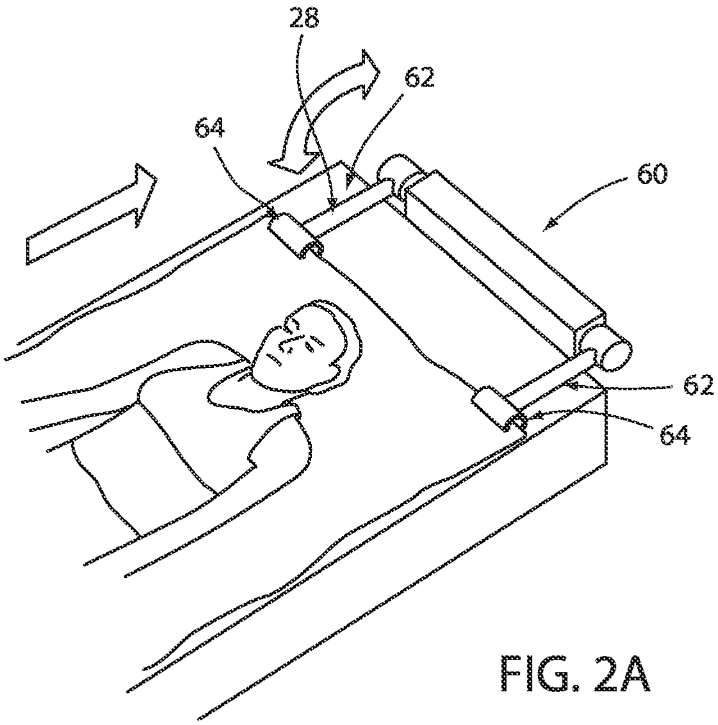
FIG. 2A is a perspective view of another mounting arrangement of a patient repositioning apparatus.

Referring to FIG. 2, as noted above, patient repositioning apparatus 12 is located at the head end of patient support apparatus 10. Further, patient repositioning apparatus 12 may include a pair of tethers 28, with each tether anchored to base 14 and further each tether including a sheet clamp 26 associated therewith. To prevent migration of the clamps toward each other when patient repositioning apparatus 12 pulls on sheet S, sheet clamps 26 may be mounted to and thereby joined by a spacer, such as a rigid beam, rod, or plate, that facilitates maintaining them in their spaced relationship.

Optionally, patient support apparatus 10 includes a footboard 40. In the illustrated embodiment, patient repositioning apparatus 12 is located adjacent and beyond footboard 40. Footboard 40 may comprise a conventional footboard that is modified to include a transverse passageway 42 through which sheet S and/or tethers may extend so that tethers may be anchored to base 14. Alternately, footboard 40 may be especially configured to incorporate patient repositioning apparatus 12, for example, to house guide 30 so that at least a portion of patient repositioning apparatus 12 is then integrated into footboard 40. The guide or guides may be located at the lower end of the headboard or at a medial portion or at the upper end of the headboard.

Figure 2B:
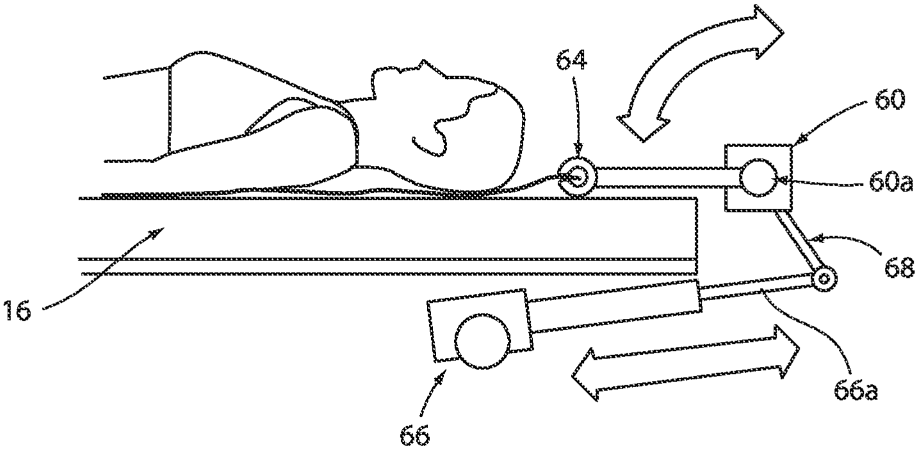
FIG. 2B is a side view of the patient repositioning apparatus of FIG. 2A.
Figure 2C:
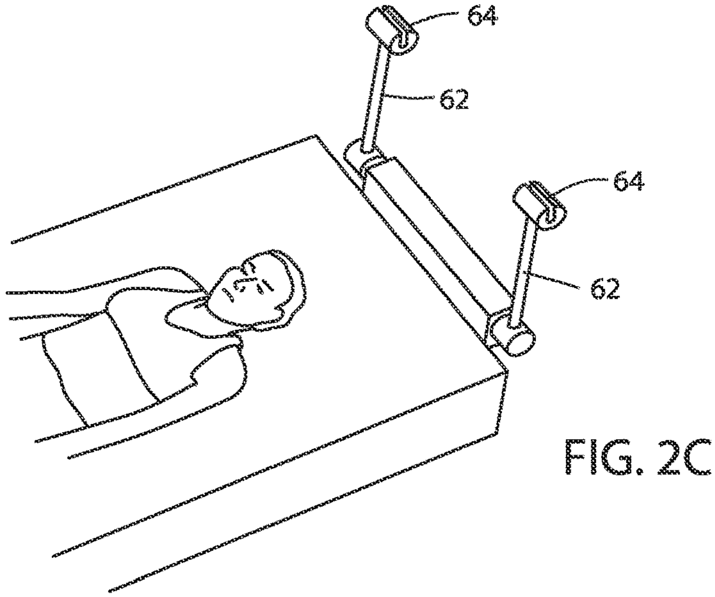
FIG. 2C is a similar view to FIG. 2A with the bars of the patient repositioning apparatus of FIG. 2A raised to a handle position.
Figure 2D:
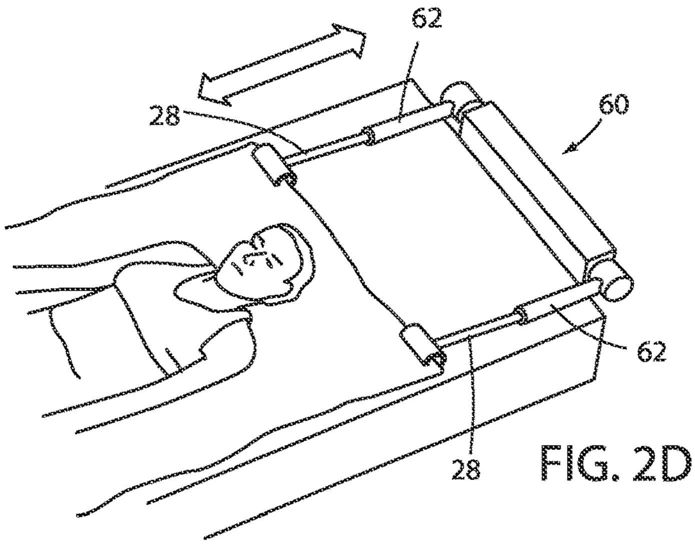
FIG. 2D is a similar view to FIG. 2A with the tethers extended.
Figure 2E:
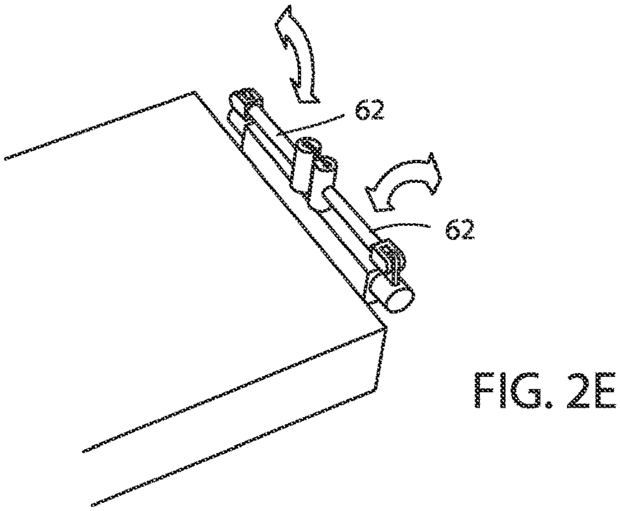
FIG. 2E is a similar view to FIG. 2A with the bars shown in a stowed position.

Alternately, referring to FIGS. 2A-2E, tether or tethers 28 may be coupled to a driver, such as a winch, including a motorized winch to power the patient repositioning apparatus 12 independent from patient support apparatus 10. For example, the driver may comprise a self-contained power enclosure 60 that may be mounted to the head end of the patient support apparatus. Furthermore, at each end of the enclosure 60, a bar 62 may be provided in a horizontal position (at the level of the mattress) and may protrude from the head end toward the foot end of the bed. Sheet clamping mechanisms 64 are provided at the end of each of the bars and coupled to the tethers 28, which extend through the bars to the winch and couple to the sheet clamps. Optionally, bars 62 may be mounted to rotate 90° up to a vertical position so that the arms can be moved to raise the tethers and the clamps. Thus, when the sheet is clamped onto the clamping mechanisms 64, bars 62 may then be rotated to their vertical position thus boosting the patient. Optionally, the bars may be telescoping to reach further to an incontinence pad. In one embodiment, the telescoping bars may be powered to extend or retract and then rotated to their vertical positions. In addition, such as shown in FIG. 2E, the bars can double as pushing handles and then stowed by being rotated 90° toward the center of the bed.

Optionally, as seen in FIG. 2B, enclosure 60 includes a transverse shaft 60*a* to which bars 62 are mounted. Shaft 60*a* may be driven by a separate driver 66, which is mounted, for example, below patient support surface 16 or may be driven by a motor in enclosure 66. Driver 66 may comprise a linear driver, such as a cylinder or electric motor that includes an extendible rod 66*a* that is coupled to shaft 60*a*, for example, by a link so that as driver 66 extends or contracts rod 66*a*, shaft 60*a* will rotate to raise or lower bars 62. Once raised, then tethers 28 and/or bars 62 can be retracted to pull on the sheet or pad supporting the patient.

In any of the aforementioned embodiments, patient support apparatus 10 may include one or more sensors for detecting the position of a patient on patient support surface 16, which generate a signal or signals that can be used to determine when a patient may need boosting. For example, patient support apparatus 10 may comprise a patient support apparatus that includes sensors and a control system for monitoring and controlling various features of the patient support apparatus, including providing communication with a remote device, such as EMR, nurse call station, Admission, Discharge, and Tracking (ADT), a server, or the Internet, such as disclosed in U.S. Pat. Nos. 7,836,531; 8,006,332; 8,689,376; and 8,413,271; and applications 61/932,574; and Ser. No. 14/578,630, which are commonly owned by Stryker Corporation of Kalamazoo Michigan and incorporated by reference herein in their entireties.

Further, the control system may monitor and use the sensor signals to either generate a local or remote alarm to let a caregiver know that the patient needs boosting or take action based on the sensor signals. For example, the control system may be used for local or remote control of the patient support apparatus. Optionally, the control system may be in communication with the sensor (or sensors) and, as noted, generate alarm condition either locally or remotely to indicate that the patient needs to be boosted. Alternately or in addition, the control system may be in communication with the sensor and control the operation of the patient support apparatus in response to signals from the sensor. For example, based on the signals from the sensor, the control system may determine that the patient needs to be boosted and actuate the lift mechanism or the driver that moves patient repositioning apparatus 12. Optionally, the control system may actuate the lift mechanism or driver incrementally to assure that the patient is not moved too far along patient support surface.

In one embodiment, the control system includes a second sensor, which also is positioned to detect the location of patient on patient support surface 16. For example, the second sensor may be used to determine when the patient has been boosted to a predefined position along the patient support surface to reduce the likelihood of a patient being boosted too far along the patient support surface. The control system may then be configured to receive signals from the first sensor that indicates a patient needs boosting and drive the lift mechanism or driver and then use the signals from second sensor to stop actuation or discontinue operation of the lift mechanism or driver once the control system determines that the patient is sufficiently boosted.

It will be understood that, in at least some embodiments, the patient repositioning apparatus, or at least a component or components of the patient repositioning apparatus, may be removable and used on another patient support apparatus. In one embodiment, the patient support apparatus is equipped with a sensor to detect the presence and identity of an individual on the patient support apparatus. Optionally, the sensor may also detect the use of the patient repositioning apparatus so that the use of the apparatus may be associated with the patient and be charged to the individual patient using the patient repositioning apparatus. In another embodiment, the sensor may be used to track use of the apparatus for compliance purposes and/or to determine its efficacy. A suitable tracking and/or transaction system to monitor the use and/or generate billing is described in application 62/081,744, which is commonly owned by Stryker Corporation of Kalamazoo Michigan and incorporated by reference herein in its entirety.

Figure 3:
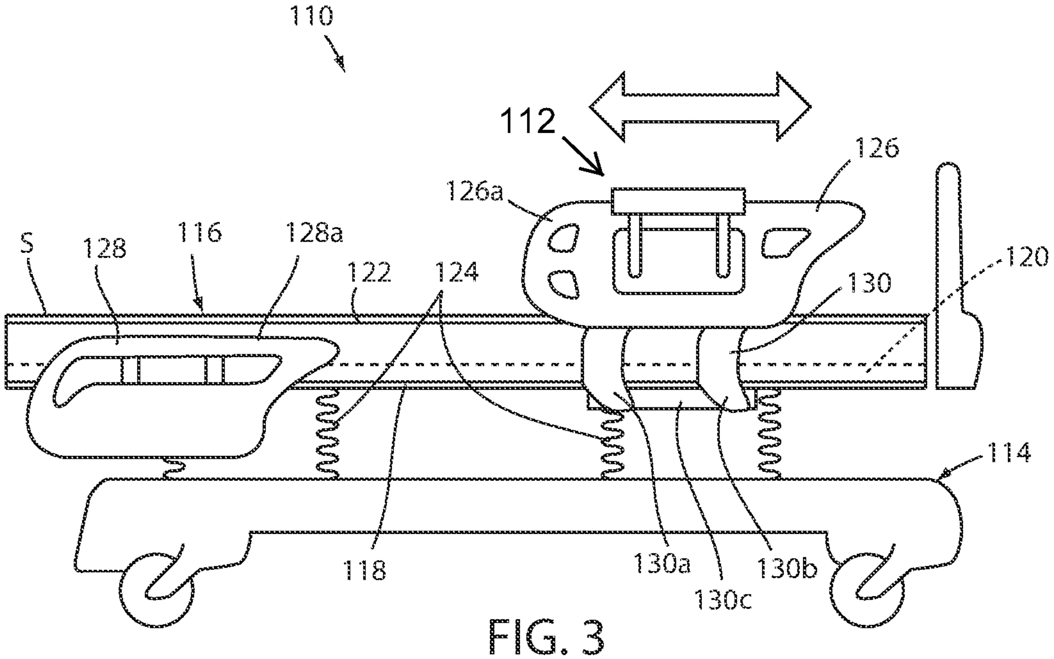
FIG. 3 is an elevation view of another embodiment of a patient support apparatus incorporating a patient repositioning apparatus.

Referring to FIG. 3, the numeral 110 generally designates another embodiment of the patient support apparatus. Patient support apparatus 110 is also configured to facilitate boosting the patient while reducing the strain on a caregiver. As will be more fully described below, patient support apparatus 110 uses the motion of a component of the patient support apparatus, such as a side rail, to lift a patient, or at least partially lift the patient, and then move the patient, for example, toward the head end of the bed, to reduce the shear stresses on the patient's skin.

Patient support apparatus 110 similarly includes a base 114 and a patient support surface 116. Patient support surface 116 optionally includes a frame 118 and a deck 120, such as a deck with articulating deck sections, to support a pad or a mattress 122 for supporting a patient thereon.

Further, patient support surface 116 is supported on base 114 by lift mechanisms 124 that are configured to raise and lower patient support surface 116 relative to base 114.

Patient support apparatus 110 also includes side rails, for example, head end side rails and foot end side rails 126, 128, which are mounted to patient support surface 116. Side rails 126, 128 may be mounted to deck 120 so that the side rails will move with the articulating deck sections to provide a barrier regardless of the positions of the deck sections. Each side rail 126, 128 includes a side rail body 126*a*, 128*a*, which are mounted to deck 120 by mounting assemblies 130. Mounting assemblies 130 move side rail bodies 126*a* and 128*a* between a lowered position (such as shown in reference to the foot end side rails 128) and a raised position (such as shown in reference to the head end side rails 126).

In the illustrated embodiment, mounting assemblies 130 include a pair of arms 130*a*, 130*b*, which are pivotally mounted at their upper ends to the respective side rail body 126*a*, 128*a* and at their lower ends to a transverse mounting member 130*c*, which mounts to the respective deck section. In this arrangement, the arms, the side rail body, and the mounting member form a four-bar linkage, which when moved moves the respective side rail body in a curvilinear path when moving the respective side rail body between its lowered and raised positions. The curvilinear path is generally shown by the dashed arrowed line in FIG. 3. Suitable side rails and/or mounting assemblies 130 are described in U.S. Pat. Nos. 7,712,166; 7,412,734; 7,836,531; and 8,006,332 which are commonly owned by Stryker Corporation of Kalamazoo Michigan and incorporated by reference herein in their entireties. For example, as described in the reference patents, mounting assemblies 130 may include springs, such as gas springs and/or coiled springs to lower the amount of force needed to raise the side rail body.

To facilitate boosting of the patient, each head end side rail 126 includes a clamp 132 for clamping a portion of sheet S overlying patient support surface 116 to the respective head end side rail. In this manner, when the side rail bodies are moved between their lowered and raised positions, the sheet will be at least partially lifted off patient support surface 116 (or at least the weight of the patient on the support surface will be reduced), and then further moved towards the head end of the patient support apparatus. By at least initially partially lifting the sheet off patient support surface 116 (or at least reducing the weight of the patient on the patient support apparatus), the friction generated by sheet S moving relative to patient support surface 116 will be reduced thereby reducing the shear stresses on the patient's skin. Thus, patient repositioning apparatus 112 is able to leverage the force of the force assist device or devices of the side rails to move the patient. Alternately, the side rails may be powered to move between their respective positions. For example, the arms for each side rail may be driven by a motor or motors. The motor or motors may be housed in the side rail bodies or mounted in the deck of the support apparatus.

Figure 5:
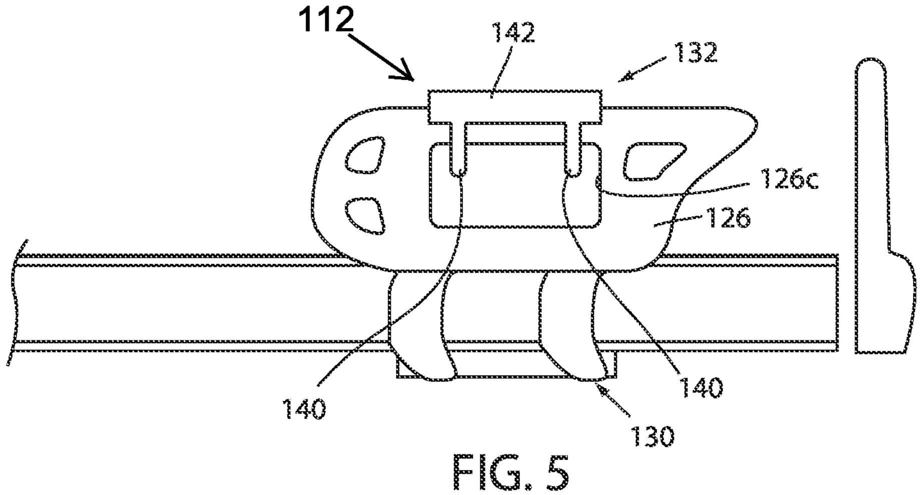
FIG. 5 is an enlarged side view of the head end side rail of the patient support apparatus.
Figure 5A:
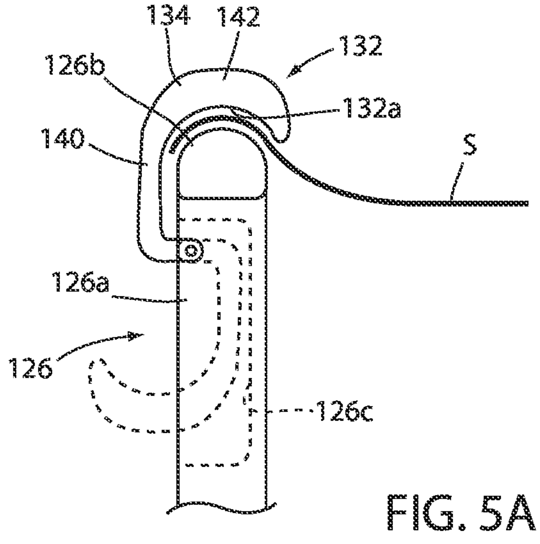
FIG. 5A is an enlarged cross-section view taken through the side rail of FIG. 3.

Referring to FIGS. 5 and 5A, side rails 126 may include clamp 132 at a central upper portion of the side rail body 126*a*. For example, a suitable clamp 132 may comprise a C-shaped body 134 with a concave downwardly facing surface 134*a* for frictionally engaging sheet S between clamp 132 and upper end 126*b* of side rail body 126*a*. Clamp 132 may be mounted for movement between a clamping position, such as shown in solid lines in FIG. 5A, and a non-clamping position, such as shown in phantom lines in FIG. 5A.

Optionally, side rail body 126*a* includes a recess 126*c* (FIG. 5A) in which clamp 132 is mounted and is supported for pivotal movement by, for example, one or more pins that extend into and pivotally mount the clamp between the side walls forming the recess, so that when clamp 132 is moved to its non-clamping position, clamp 132 may be at least partially recessed and stowed within side rail body 126*a*. Optionally, recess 126*c* is sized to allow clamp 132 to be fully recessed in side rail body 126*a*. Furthermore, side rail body 126*a* may include a removable door or cover to enclose, and optionally, hide clamp 132 in side rail 126, which may facilitate cleaning.

Referring again to FIG. 5, clamp 132 may be formed by a pair of C shaped arms 140, which are spaced apart and pivotally mounted to side rail body 126*a*. Arms 140 support a transverse clamping member 142 that forms the concave inwardly facing surface 132*a* for engaging sheet S between clamp 132 and side rail body 126*a*. Optionally, side rail body 126*a* includes a pair of recesses in which arms 140 are pivotally mounted and further adapted to receive arms 140 (when claim 132 is moved to non-clamping or its stowed position), and optionally a larger recess to receive transverse clamping member 142 so that again clamp 132 may be at least partially or fully recessed in side rail body 126*a*.

In either embodiment of the clamp, the inwardly facing surface 132*a* may include a high friction surface to enhance the gripping of the sheet. For example, the high friction surface may be formed in the surface or applied to the surface. A suitable high friction surface may include a knurled surface or ridges formed on clamp 132 or a surface applied to clamp 132 formed from a material with a high coefficient of friction, such as rubber, to thereby increase the retention of sheet in the clamp.

Figure 4:
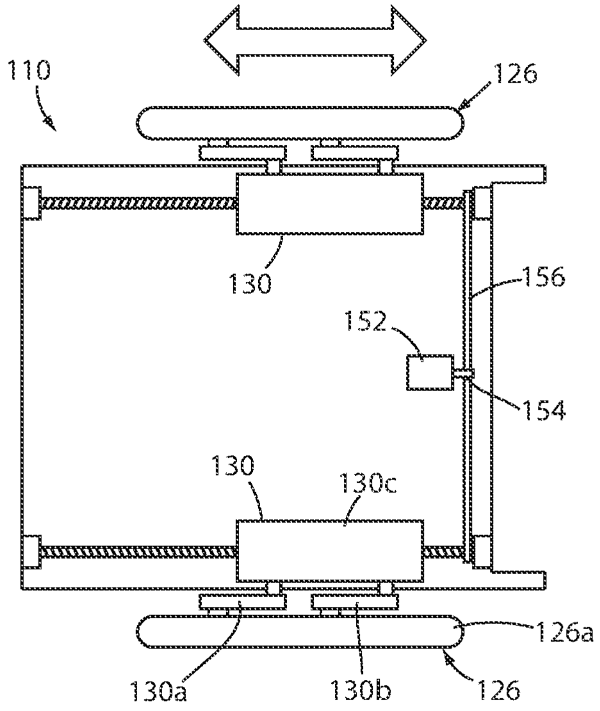
FIG. 4 is a fragmentary plan view of the patient support apparatus of FIG. 3.

Referring to FIG. 4, each side rail 126 may also be mounted for linear movement relative to patient support apparatus 110 so that in addition to the curvilinear motion of the respective side rail bodies, mounting assemblies 130 may also translate linearly relative to patient support surface 116. In this manner, when sheet S is clamped onto a respective head end side rail 126 and its respective side rail body 126*a* is moved to its raised position, additional motion of the sheet in the direction of the head end may be obtained by linearly moving mounting assemblies 130 relative to patient support surface 116.

Figure 6:
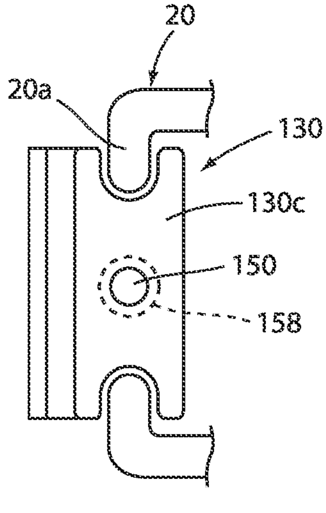

In the illustrated embodiment, side rails 126 may be mounted on screw drives formed by threaded driven rods 150, which are mounted for rotation in deck 120 and which are optionally driven, for example, by one or more motors 152. In the illustrated embodiment, a single motor is provided whose output shaft 154 is coupled to a drive rod 156. Drive rod 156 includes threads at least at its opposed ends to engage and drive the respective driven rods 150. As noted above, each mounting assembly 130 includes a mounting member 130*c*, which includes a threaded sleeve 158 to receive a respective threaded driven rod 150, so that when motor 152 is driven and driven rods 150 are rotated about their longitudinal axes, side rails 126 will move linearly with respect to patient support surface 116 to thereby increase the range of motion of clamps 132. Optionally, referring to FIG. 6, each mounting member 130*c* may be mounted in the side 120*a* of deck 120, for example, in a longitudinal opening 120*b* that forms a channel that provides a guide for mounting member 130*c*, which may provide additional support to the respective side rail.

Alternately, a manual driver, such as a handle may be coupled, for example, by way of a similar drive rod, to driven rods 150. Further, in lieu of driven rods 150, mounting assemblies 130 may be mounted to deck 120 on linear bearings (not shown), which can provide manual linear movement of the respective side rails relative to the patient support surface (or driven linear movement by way of a linear driver, such as a linear motor, coupled to the side rail). Optionally, one or more detents or locking mechanisms may be included to define preset positions for the side rail along the bearings.

Referring to FIG. 7, the numeral 210 generally designates another embodiment of the patient support apparatus. Similar to the previous embodiments, patient support apparatus 210 includes a patient repositioning apparatus 212, which may be integrated into patient support apparatus 210, to boost a patient.

Patient support apparatus 210 includes a base 214 and a patient support surface 216, which is supported on base 214 by lift mechanisms 224. As described in reference to the previous embodiments, patient support surface 216 may include a frame 218 and a deck 220 with articulatable deck sections, which support a pad or mattress 222. Mounted to the side of patient support surface 216 are side rails 226, which may include head end side rails and foot end side rails (not shown). For examples of suitable side rails 226, reference is made to U.S. Pat. Nos. 7,712,166; 7,412,734; 7,836,531; and 8,006,332, which are commonly owned by Stryker Corporation of Kalamazoo, Michigan and incorporated by reference herein in their entireties.

Referring to FIG. 7, patient repositioning apparatus 212 is mounted adjacent patient support surface 216 between the side rail 226 and patient support surface 216. As will be more fully described below, patient repositioning apparatus 212 is configured to engage a sheet S (or incontinence pad) overlying patient support surface 216 and at least partially raise sheet S above patient support surface 216, and further move sheet S toward the head end of patient support apparatus 210, in a similar manner described in reference to the previous embodiment, to thereby boost a patient supported on patient support apparatus 210.

In the illustrated embodiment, patient repositioning apparatus 212 includes a pair of clamps 232 that are mounted on the opposed sides of patient support apparatus 210 independently of the movement of the side rails. In the illustrated embodiment, each clamp 232 is mounted to patient support apparatus 210 by a pair of arms 240. Arms 240 are pivotally mounted at their upper ends to clamp 232 and pivotally mounted at their lower ends to a carrier or mounting member 242, which is mounted to patient support surface 216. For example, mounting members 242 may be mounted below deck 220 at frame 218 or mounted to deck 220. Each arm 240 of the pair of arms is spaced apart and generally parallel to form a four-bar linkage with clamp 232 and mounting member 242. Thus, when the pair of arms 240 rotates, clamps 232 are raised or lowered in a curvilinear path similar to clamps 132.

Mounting members 242 may also be mounted for linear movement relative to patient support surface 216. For example, mounting members 242 may be mounted to screw drives in the form of driven threaded rods 250, similar to driven rods 150 described in reference to patient support apparatus 110. In the illustrated embodiment, driven threaded rods 250 may also be driven by a single motor 252 (which is mounted in patient support surface for example in frame 218 or deck 222) with an output shaft 254 that drives a drive rod 256. It should be understood, just as in the case of patient repositioning apparatus 110, that more than one motor may be used to drive driven rods 250. Drive rod 256 includes threaded portions, for example threaded ends, to engage and drive driven threaded rods 250, such as shown in FIG. 8. Mounting members 242 similarly include threaded sleeves to receive and engage threaded rods 250 so that as the threaded rods are rotated about their respective longitudinal axes, mounting members 242 and clamps 232 will be moved linearly along the respective threaded rod.

As the threaded rods 250 are driven to move clamps 232 forward toward the head end of the patient support apparatus, the weight of the patient on the sheet S will resist, which causes clamps 232 to raise up. As clamps 232 raise up, the weight of the patient on patient support surface 216 will be reduced to thereby reduce the friction between sheet S and patient support surface 216 to thereby reduce shear forces on the patient's skin. Referring again to FIG. 7A, the motion of clamp 232 is up and forward as driven rods 250 are rotated so that the sheet is initially at least partially lifted off patient support surface 216 before it is moved toward the head end of patient support apparatus 210. Optionally, the motion of clamps 232 may be coupled to a motor or motors so that clamps 232 are directly driven by a motor or motors, which may be more suitable for heavier patients.

Referring to FIGS. 10-12, clamps 232 each include a clamping arm 236 and a base 234 to which arms 240 are pivotally mounted. Each clamping arm 236 is pivotally mounted, for example, at one end thereof to base 234 and movable between a closed position, such as shown in FIG. 10, and an open position such as shown in FIG. 11. Optionally, each clamping arm 236 includes a latch 238 for engaging base 234 when arm 236 is in its closed position. For example, latch 238 may comprise a spring biased latch that engages an engagement structure provided on base 234 and is biased in a normally latched position. Alternately, latch 238 may comprise a flexible finger with a snap-fit arrangement that engages a corresponding detent structure on base 234 or simply provides a frictional coupling between arm 236 and base 234. Alternately as shown in FIG. 12, a suitable latch 238' may include a cam lever style latch where a hook engages a detent on base 234, and the lever is repositioned so that the cam goes over center to become secured in place.

Referring again to FIG. 10, when a portion of sheet S is positioned between clamping arm 236 and base 234, clamping arm 236 may be moved to its closed position to thereby engage sheet S between the downwardly facing surface **236*a* of clamping arm 236 and upwardly facing surface 234*a* of base 234. Optionally, one or both of the respective facing surfaces 236*a*, 234*a* may include a high friction surface either formed or applied thereon. For example, a suitable high friction surface may comprise a knurled surface or ridges formed in the respective members or a rubber surface applied thereon, including by injection molding. In this manner, sheet S is frictionally engaged by clamp 232, when clamping arm 236** is moved to its closed position.

Alternately, clamps 232 may each include a track, for example, a driven track to pull sheet S forward to the head end of the patient support apparatus. Optionally clamps 232 may include upper and lower driven tracks, for example, on clamping arm 236 and on base 234 to thereby pull the sheet S. Further, the sheet may include a rope or cord structure so that the sheet does not get pulled through.

As noted above, patient repositioning apparatus 212 may be located between patient support surface 216 and side rail 226. For example, patient repositioning apparatus 212 may be sandwiched between the head end head section of deck 220, namely the Fowler, and the side rail. Furthermore, apparatuses 212 may be housed in the Fowler and, therefore, can be used when the Fowler is in a raised position. Thus, boosting may be achieved when a patient is in an inclined position.

Alternately, patient repositioning apparatus 212 may be stowed below patient support surface 216 or may be incorporated into pad or mattress 222. For example, pad or mattress 222 may include a recess or relief area in its sides into which clamps 232 (and optionally arms 240) may be moved when in their inoperative or stowed positions. To move the clamps (and arms), each clamp 232 and/or arms may include a camming assembly that laterally translates the respective clamps (and optionally arms) so they move outwardly when moved to their deployed positions but then move inwardly into the respective recess or relief in pad or mattress 222 when in their stowed positions. For example, the camming assembly may be provided on arms 240 at their pivotal connection to mounting members 242. An example of a suitable lateral translation device, reference is made to U.S. Pat. No. 7,784,125 which is commonly owned by Stryker Corporation of Kalamazoo, Michigan and incorporated by reference herein in its entirety.

With the clamp arrangement of the present embodiment, the range of motion of clamps 232 may be increased over at least some of the clamps in the previous embodiments. For example, the range of motion of clamps 232 may extend to reach and engage an incontinence pad, which may be used to translate the patient along the patient support surface 216.

Although illustrated as moving in a curvilinear path, clamps 232 may be configured to move vertically upward, then laterally, and then vertically downward.

Referring to FIG. 13, the numeral 310 generally designates yet another embodiment of a patient support apparatus. Patient support apparatus 310 similarly includes a patient repositioning apparatus 312 that is incorporated into patient support apparatus 310. Similar to the previous embodiments, support apparatus 310 includes a base 314 and a patient support surface 316, which is mounted to base by lift mechanisms 324 that are configured to raise or lower patient support surface 316 relative to base 314. Patient repositioning apparatus 312 is configured to facilitate boosting of a patient on patient support surface 316 and, in the illustrated embodiment, is incorporated into the side rails 326. As will be more fully described below, similar to patient repositioning apparatus 112, the motion of the side rails is used to move the sheet S to reposition the patient on patient support surface 316.

In the illustrated embodiment, patient repositioning apparatus 312 is configured to translate relative to side rail body 326*a* and, further, may be mounted to the outwardly facing side 326*b* of said side rail body 326*a* or inside side rail body 326*a*, as described below. Patient positioning apparatus 312 includes clamps 332 that are mounted to side rails 326 and are configured to engage a sheet S positioned on patient support surface 316 and to pull sheet S toward the head end of patient support apparatus 310 when side rail 326 is moved between a lowered position (not shown) and a raised position shown in FIG. 13. Optionally, clamps 332 are supported for linear movement along the respective side rail body 326*a* of each side rail 326 by a drive screw 350, such as a threaded rod, which are mounted to the surfaces 326*b*. In this manner, clamps 332 may have a greater range of motion, for example, than clamps 110.

Each drive screw 350 may be driven by a motor 353 (FIG. 14), which is also mounted to side rail body 326*a*, so that clamps can be selectively translated relative to the side rail bodies. For example, motor 352 may be controlled by a patient support apparatus based control system described above, including based on sensor signals received from sensors located at patient support apparatus 310. For further details of suitable sensors that may be used in combination with patient repositioning apparatus 310, reference is made to above description. In addition to detecting when a patient requires boosting and to detecting the position of the patient, sensors may be provided to detect the position of the clamp relative to the side rail body so that the control system may provide discrete adjustments or adjustments in defined increments to the position of the sheet relative to the patient support surface 316.

Referring to FIG. 14, clamps 332 may be positioned in an opening or window 326*c* formed in side rail body 326*a* so that the clamps may extend through the respective side rails 326 to engage the opposed edges or sides of sheet S positioned on the patient support surface 316. As best seen in FIG. 15 opening 326*c* extends through side rail body 326*a*. Alternately, where the patient repositioning apparatus 312 is located inside the side of body, opening 326*c* may extend through inwardly facing side 326*d* of the side rail body 326 only so that the patient repositioning apparatus is not viewable from the outwardly facing side of the side rail.

Furthermore, drive screw 350 may be located inside side rail body 326*a* so that it is positioned between inwardly facing side 326*d* and outwardly facing side 326*b* of side rail body 326*a*. As best seen in FIG. 15, clamps 332 may be mounted on drive screw 350 by one or more mounting members 340, which include sleeves 340*a*, namely threaded sleeves, for receiving and engaging drive screw 352 so that when drive screw 350 is rotated about its longitudinal axis, mounting member(s) 340 and clamp 332 will translate along drive screw 350.

Referring to FIG. 13, side rail body 326*a* is mounted to patient support surface 316 by a pair of arms 330. Arms 330 are pivotally mounted at their upper ends to side rail body 326*a* and pivotally mounted at their lower ends to a mounting member 331, which is adapted to mount side rail 326 to deck 320 or frame 318. In this manner, arms 330, side rail body 326, and mounting member 331 form a 4 bar linkage, similar to the previous embodiments. When mounted to deck 320, side rail 326 will move with the deck so that side rail 326 will provide a continuous barrier (when raised) regardless of the angle of the deck sections (in this case the head section or "Fowler").

In the illustrated embodiment, arms 330 are pivoted by an actuator 370. For example, actuator 370 may comprise an electric linear actuator with an output shaft 370*a* that extends and contracts to drive the motion of the side rail. For example, the output shaft 370*a* may be coupled to a link 372 that is coupled, e.g. eccentrically mounted, to one of the arms 330 to rotate the respective arm 330 about its pivot connection to mounting member 331, and thereby raise or lower side rail body 326*a*.

In any of the above embodiments, the patient support apparatus may include a control system that incorporates a pinch detection system to detect when a sheet is pinched in the patient repositioning apparatus. For example, a pressure sensitive strip may be incorporated into the clamp to detect the presence or absence of a sheet and proper positioning of the sheet in the clamping device.

While several forms of the invention have been shown and described, it should be understood that features of one embodiment may be combined with features of another embodiment. Further while not specifically noted in each case, the various components forming the patient repositioning apparatus may be made from metal, plastic, or hybrid materials, including reinforced plastic. Furthermore, while a standard sheet may be used in conjunction with the patient repositioning apparatuses described herein, a sheet with a low friction surface may be used including sheets formed from Tyvek, and as noted may be a pad, including an incontinence pad. In addition, in the embodiments that provide additional linear travel for the clamps, the clamps may have a travel in a range of approximately 8-24 inches, 12-20 inches, and optionally in a range of 14 to 18 inches. Furthermore, the size of the clamps may vary. A suitable clamp length may be in a range of 10-16 inches long, and optionally 12-14 inches long. Additional features that may be incorporated into any of the above patient repositioning devices include a quick release device. For example, a quick release mechanism may be included in any of the actuators or the clamps themselves for emergency situations or anywhere in the mounting assemblies.

Accordingly, patient support apparatuses and patient repositioning apparatuses are described that can reduce the stress on a caregiver when trying to boost a patient. Further, in some embodiments, the patient support apparatuses and patient repositioning apparatuses can reduce the patient's weight applied to the patient support apparatus, at least in the region of the patient's center of gravity, such as the patient's sacral, and slide the patient up the patient support apparatus to boost the patient after the weight is reduced to thereby reduce at least some of the shear forces on the patient's skin.

In any of the embodiments, one or more components of the patient repositioning apparatus may be removed for use on another patient support apparatus or stowed away, for example, in a recess in the patient support apparatus, including in the side rails or the patient support surface. Additionally, the entire patient repositioning apparatus may be removed and used on another patient support apparatus.

Referring to FIGS. 17-21, the numeral 412 generally designates another embodiment of a patient repositioning apparatus incorporated into a patient support 410, such as a hospital bed, a stretcher, a cot, an operating room (OR) table or the like. In the illustrated embodiment, patient support 410 comprises a hospital bed with movable side rails 426. As will be more fully described below, patient repositioning apparatus 412 is incorporated into side rails 426 of the patient support 410, for example, the head end side rails (FIG. 21 shows both head end side rails), and allows a caregiver to couple the sheet on a mattress 422 to the side rails 426 so that the motion of the side rails 426 can be used to move the sheet toward the head end of the mattress 422. Thus, when the side rails are moved from a lowered position, or an intermediate raised position, to their upper raised position (such as shown in FIG. 21), the sheet will be lifted and then moved toward the head end of the bed 410. In this manner, the side rails may be used to boost the patient supported on patient support 410. By at least partially lifting the sheet off the mattress, the frictional forces and shear on the patient's skin can be reduced. For examples of suitable side rails 426, reference is made to U.S. Pat. Nos. 7,712,166; 7,412,734; 7,836,531; and 8,006,332, which are commonly owned by Stryker Corporation of Kalamazoo, Michigan and incorporated by reference herein in their entireties.

As best seen in FIGS. 17-20, patient repositioning apparatus 412 includes a frame 430, which is movably mounted to each side rail 426 to move from a fully raised or clamping position, such as shown in FIG. 17, to engage a sheet S, such as shown in FIG. 20, and lowered or disengaged positions, such as shown in FIGS. 18 and 19. For ease of description, reference will be made to one of the side rails. It should be understood that the same details are applicable to the other side rail.

Frame 430 may be mounted to the inwardly facing side 432 of side rail 426, or may be mounted in side rail 426, as described below. Each side rail 426 includes a side rail body 434, for example, formed from a perimeter frame member 436 that is covered by plastic, such as by overmolding outer and inner panels 438 and 440, or by securing thereto preformed outer and inner panels 438 and 440. In the illustrated embodiment, frame 430 is mounted inside body 434 between outer and inner panels 438 and 440. Additionally, side rail body 434 is formed with one or more through openings 442, 444, and 446, which extend from the inwardly facing side to the outwardly facing side of side rail body 434. Openings 444 and 446 form hand holds, while opening 442 forms an access window for receiving sheet S there through so that sheet S can be engaged and clamped by frame 430. As described more fully below, frame 430 is mounted to translate in opening 442, when frame 430 is moved between its lowered position and its engaged position, such as shown in FIGS. 17 and 20, to thereby clamp the sheet in side rail 426.

Side rail body 434 may be formed with a cavity 448 for receiving frame 430. For example, cavity 430 may be sized so that frame 430 can be fully lowered into cavity 448 when moved to its fully lowered or lowermost, disengaged position. Further, frame 430 is mounted for vertical movement in cavity 448 such that the upper end 450 of frame 430 (FIG. 18) can be moved to a position so that it is flush or beneath the lower edge 452 of opening 442 when frame 430 is moved to its fully lowered position within the side rail body 434 (not shown). When frame 430 is moved to its fully extended or clamping position, upper end 450 of frame 430 abuts or is extended into an upper portion 454 of frame member 436 of side rail body 434 to thereby clamp sheet S between the upper end 450 and upper portion 454. In the illustrated embodiment, upper portion 454 includes a recess that extends along its length to receive upper end 450 of frame 430. However, it should be understood that the upper portion 454 may have a solid continuous lower facing side (no recess), with upper end 450 of frame 430 clamping against the lower facing side of upper portion 454.

In the illustrated embodiment, frame 430 comprises an open frame formed by an outer perimeter frame member 460 and an intermediate frame member 462. Intermediate frame member 462 joins upper and lower portions 464 and 466 of outer perimeter frame member 462 to thereby reinforce outer perimeter frame member 460. Further, intermediate frame member 462 defines two openings 464 and 466, which may be equal in size, to form finger clearances in frame 430. Optionally, frame 430 may be sized to provide gaps 468 and 470 on either side of outer perimeter frame member 462 between frame 430 and side rail body 434, also to provide finger clearances on either side of frame 430.

Frame 430 is moved between its non-engaged positions and its clamping position by an actuator assembly. For example, a suitable actuator for the actuator assembly includes a linear actuator, such as an electric, pneumatic or hydraulic actuator. In one embodiment, the actuator comprises one or more motors that drive a rack and gear assembly. For example, as best seen in FIGS. 17 and 17A, toothed racks 472, 474 may be mounted in cavity 448 on opposed ends of frame 430, with gears 476 and 478 mounted to the lower opposed ends of frame 430 for engaging racks 472, 474. For example, gears 476, 478 may be powered by one or more motors 476*a*, 478*a* mounted in frame 430.

Alternately, a four-bar linkage assembly or X-frame may be positioned beneath frame 430 in cavity 448, and optionally coupled to frame 430, which may be driven to extend or retract by an actuator, such as a linear actuator or a driven gear, such as a cycloidal gear and motor, to thereby raise or lower frame 430.

In another embodiment, frame 430 may be raised or lowered one or more drive screws, which may be driven to extend or retract frame 430 by a gear, such as a cycloidal gear, and motor, mounted, for example, in side rail body 434. For example, the drive screws may extend into frame 430, with frame 430 coupled to the drive screws by followers so that when the drive screws are driven to rotate about their longitudinal axes, the followers will raise or lower frame 430 relative to the drive screws.

Optionally, each side rail 426 incorporates a quick release mechanism 480 to decouple the motive power of the actuator from frame 430 to allow frame 430 to move to its non-engaged or lowered position and thereby release the sheet S from engagement with the side rail. For example, once decoupled from the actuator, frame 430 may return to its non-engaged or lowered position under the force of gravity or under the force of a spring, for example, mounted to frame 430 and located in cavity 448 of side rail body 434. For examples of several other quick release mechanisms, reference is made to FIGS. 24D-F. Alternately, as described below, the quick release mechanism may be incorporated into the side rail mounting mechanism to allow quick lowering of the side rail from its raised position, for example, in a "Code" situation where the side rails must be lowered very quickly and caregivers have maximum access to the patient.

In the illustrated embodiment and as best seen in FIG. 17A, quick release mechanism 480 comprises a handle 480*a* that is pivotally mounted to side rail body 434 and which is coupled to the actuator or gear, for example, via a link 482. Optionally, link 482 may comprise a cable 482*a* or linkages or a combination of both. When handle 480*a* is pivoted, link 482, which is coupled to gears 476, 478, disengages gears 476, 478 from their driving positions (i.e., engaged with racks 472, 474) and allow frame 430 to return to its disengaged or retract position.

In one embodiment, cable 482*a* comprises a Boden cable (a push-pull cable). Further, as best seen in FIG. 17A, gears 476 and 478 may be coupled to a linkage assembly 484, which is mounted in frame 430. For example, gears 476, 478 may be mounted to frame 430 on movable shafts or the gears may be movably mounted on their respective drive shafts, which allows each gear 476, 478 to move between an extended, engaging position for engaging racks 472, 474 and a retracted, non-engaging position. Gears 476, 478 may be biased into their engaging positions, for example, by springs mounted about the respective shafts.

In the illustrated embodiment, linkage assembly 484 may include a spring biased crank arm 486, which is rotationally mounted about its medial portion to frame 480 and eccentrically coupled to linkages 488 of linkage assembly 484. Cable 482*a* is coupled to crank arm 486 so that when cable 482*a* is pulled, crank arm 486 will rotate about its rotational axis. In this manner, when crank arm 486 is rotated about its rotational axis by cable 482*a* (when handle 480 is pulled as shown in FIG. 18), crank arm 486 will rotate in a counter-clockwise direction as viewed in FIG. 18 and thereby pull on links 488 (which are coupled to the shafts of the gears) to disengage gears 476 and 478 from their respective tracks 472, 474. Once the handle 480 is return to its stowed position, such as shown in FIGS. 17 and 20, cable 482*a* pushes on crank arm 486 to rotate crank arm 486 in a clockwise direction, and thereby push the linkages 488 to push the respective gears 476, 478 to their engaging positions for re-engagement with their respective rack 472, 474.

Optionally, handle 480*a* is mounted to an end of side rail 426, for example to the head end of side rail 426, so that it is accessible by a caregiver. Further, handle 480*a* may be configured to generally follow the contour of the side rail body 434, such as shown in FIGS. 17 and 18.

Referring again to FIGS. 18-20, when frame 430 is lowered, a portion of sheet S may be extended through opening 442. Once the portion of sheet S is extended into opening 442, frame 430 may be moved to its extended, clamping position to thereby clamp sheet S between frame 430 and upper portion 454. Optionally, upper end 450 of frame 430 and/or the underside of upper portion 454 includes an enhanced gripping surface 490 to thereby enhance the clamping of sheet S there between. Gripping surface 490 may be formed by ribs, ridges, knurling, or a high friction material, such as a material with a soft durometer, including a gel, which is coupled or applied to or formed with frame 430 and/or upper portion 454. For example, the ribs may extend longitudinally along the respective surface or the ribs may extend laterally across the respective surface, and further cooperate with ribs formed on the opposing surface, such as shown and described in reference to FIGS. 22-24.

Referring to again FIG. 21, after sheet S is coupled to side rails 426 by patient repositioning apparatus 412, side rails 426 may be raised to their upper raised position to thereby lift the patient off the mattress 422 and then shift or lift the patient toward the head end of patient support 410 to thereby "boost" the patient. Once the patient has been boosted, the side rails can be returned to their lowered or intermediate position adjacent mattress 422, and the sheet may then be decoupled from the side rail. Alternately, one of the side rails may be raised to its raised position so that one side of a patient is lifted, which can assist in turning a patient.

Referring to FIGS. 22-24, the numeral 512 designates yet another embodiment of a patient repositioning apparatus, which is also mounted in side rails 526 (only one shown, see previous embodiments for illustrations of how the side rails can be used together). As will be more fully described below, patient repositioning apparatus 512 includes an enhanced gripping surface in the form of ribs on its movable frame 530, as well as on a stationary member 531 supported in side rail body 534 of side rail 526. Similar to the previous embodiment, each frame 530 is movably mounted in a respective side rail 526 to move from a fully raised or engaged, clamping position, such as shown in FIG. 22-23, for engagement with a sheet, similar to such as shown in FIG. 20, to lowered or disengaged positions, such as shown in FIG. 24.

In the illustrated embodiment, frame 530 is mounted in side rail body 534 of side rail 526. As best seen in FIG. 22, side rail body 534 is formed from a perimeter frame member 536 that is covered by plastic, such as by overmolding or by securing preformed inner and outer panels (not shown) to frame member 536. Frame member 536 includes an upper portion 536*a* for supporting stationary member 531 of clamp 530 and a lower portion 536*b* (FIG. 23), which is reinforced to mount side rail 526 to a patient support 510. Additionally, in the illustrated embodiment, side rail body 534 is formed with one or more through openings 552 and 554, which extend through side rail body 534. Opening 554 forms a hand hold, while opening 542 forms an access window for receiving sheet S there through so that sheet S can be engaged by frame 530, similar to the previous embodiment. Frame 530 is mounted to translate vertically in opening 542 so that frame 530 can move between its lowered position and its engaged, clamping position, such as shown in FIGS. 22 and 23.

Side rail body 534 may also include a cavity 548 for receiving frame 530. In the illustrated embodiment, cavity 548 is defined between a pair of vertical mounting members 548*a* and 548*b* and above horizontal mounting member 538*c*, which are secured to frame member 536, for example by fasteners or welding, or the like. Mounted to the inwardly facing sides of mounting members 548*a* and 548*b* are rails 572 and 574. Rails 572 and 574 guide frame 530 between its raised or engaged, clamping position (FIG. 22) and its lowered or disengaged positions (FIG. 24).

To move frame 530 between raised its engaged, clamping position and its lowered or disengaged positions, side rail 526 includes an actuator assembly 575. In the illustrated embodiment, actuator assembly 575 includes a handle 580 pivotally mounted to side rail body 534 about a rotational axis 581 and a link 582, which is coupled on one end to handle 580 and coupled at its other end to a carriage 586. Link 582 translates the rotational motion of handle 580 into linear motion of carriage 586, which in turn raises or lowers frame 530 along rails 572 and 574. Optionally, link 582 comprises a rigid linkage, but it should be understood that a push-pull cable could be used instead, such as a Boden cable.

For example, handle 580 may include an arm or a lobed portion 584 about its rotational axis to which link 582 is anchored at one end. Furthermore, handle 580 may include a spring that biases the handle, for example, in a clamping position where carriage 596 is moved to a position shown in FIG. 22) that corresponds to the frame 530 being its raised or clamping position. Carriage 586 is coupled to the other end of link 582 and movably mounted on transverse mounting member 548*c*, which is secured between frame member 536 and mounting member 548*b*. Carriage 586 translates along mounting member 548*c* when handle 580 is pivoted about its rotational axis 581 (between its non-clamping position and clamping position) to thereby form a driver to push or pull on frame 530, as more fully described below.

In the illustrated embodiment, carriage 586 comprises a pair of spaced apart plates 588, 590, which support a pair of rollers 592. Rollers 592 are guided by ramps 530*a*, 530*b* provided on frame 530. In the illustrated embodiment, ramps 530*a*, 530*b* are formed by adjacent or side-by-side elongate openings or slots provided in frame 530. To translate the linear motion of carriage 586 into vertical motion in frame 530, the openings are angled upwardly on one end. Carriage 586 also may include one or more rollers 594 that guide link 582 through carriage 586 to its anchor point on carriage 586. For example, when handle 580 is rotated upward about its pivoted axis, link 582 will pull on carriage 586, which will cause carriage 586 to translate along transverse mounting member 548*c*. As carriage 586 moves along member 548*c*, rollers 592 will pull or push on frame 530.

As would be understood, when handle 580 is lifted and pivoted about rotational axis 581, link 582 pulls on carriage 586, which causes rollers 592 to translate along ramps 530*a* and 530*b* to the right as viewed in FIG. 22. Consequently, as carriage 586 is moved to the right as viewed in FIG. 22, frame 530 will lower. In contrast, when handle 580 is pivoted downwardly about its rotational axis 581, such as shown in FIG. 22, link 582 will push carriage 586 to the left as viewed in FIG. 22 to return carriage 586 to its lifting position where rollers 592 of carriage 586 return to the lowered ends of the ramps 530*a*, 530*b* and thereby raise frame 530 to its engaged, clamping position.

In the illustrated embodiment, frame 530 comprises a plate 596 with transverse openings 596*a*, 596*b* that form ramps 530*a*, 530*b*. However, it should be understood that frame 530 may have different constructions, such as an open frame construction with the ramps formed sub-frames within the open frame. Similar to the previous, frame 530 may be sized to provide gaps (not shown) on either side to provide finger clearances between frame 530 and side rail body 534.

As noted above, upper end 598 of frame 530 includes an enhanced gripping surface 600 to enhance the clamping of sheet S. In the illustrated embodiment, enhanced gripping surface 600 comprises a plurality of spaced, apart ribs 600*a*. Ribs 600*a* run transversely across frame 530 and are configured to engage corresponding recesses 604*a* formed by an enhanced gripping surface 604 provided on stationary member 531. Stationary member 531 is mounted to frame member 536 of side rail body 534 at the upper end of opening 552 beneath the upper portion 536*a* of frame member 536. Further, in the illustrated embodiment, ribs 600*a* and recesses 604*a* are formed by mirror image undulating surfaces provided or formed on frame 530 and stationary member 531. Further, one or both undulating surfaces may include a high friction surface applied thereto, for example, by coating or during the forming process (e.g., co-injection molding of frame 530 and stationary member 531). High friction surfaces may be formed from a high friction material, such as a material with a soft durometer, including a gel, which is coupled or applied to or formed with frame 530 and/or stationary member 531.

Optionally, handle 580 is also mounted to an end of the side rail 526, for example to the head end of side rail 526, so that it is accessible by a caregiver. Further, handle 580 may be configured to generally follow the contour of the side rail body (outer surface may be similar to side rail body 434).

Optionally, carriage 586 is guided along transverse member 548*c* by a pair of rails 548*d*, which are mounted to either side of transverse member 548*c*. Rails 548*d* are secured to member 548*c* by fasteners or welds, or may be integrally formed with member 548*c* to thereby form a track along which carriage 586 may slide or roll (carriage may also include additional rollers or bearings to roll along upper side of member 548*c* between rails 548*d*).

As noted above, patient repositioning apparatus 512 may be used in a similar manner as patient repositioning apparatus 412. Accordingly, reference is made to the previous embodiment for a description of how apparatus 512 may be used.

Referring to FIG. 24A, the numeral 575' designates another embodiment of an actuator assembly that may be used to move frame 530 between its lowered position and its clamping position. In the illustrated embodiment, actuator assembly 575' includes an X-frame 575*a* and an actuator 575*b*, which comprises a linear actuator, such as electric, pneumatic, or hydraulic actuator. X-frame 575*a* includes one fixed pivot axis 575*b* at the lower end thereof and mounted in cavity 548, for example, to mounting member 548*c*, and a movable pivot axis 575*c* mounted in a track or slotted opening provided in the mounting member 548*c*. Actuator 575*b* coupled to the X-frame at or near the movable pivot axis to thereby extend or contract X-frame 575*a*. The upper ends of X-frame 575 optionally also include one fixed pivot axis and one moving pivot axis mounted to frame 530 or may include two moving pivot axes 575*d, e* that when X-frame 575*a* is extended or contracted so there is sufficient play to accommodate the movement of the X-frame arms.

Referring to FIG. 24C, the numeral 575" designates another embodiment of an actuator assembly that may be used to move frame 530 between its lowered position and its clamping position. In the illustrated embodiment, actuator assembly 575" includes a gear 576" and a motor (not shown) and a tooth rack 578", which is either formed or mounted to frame 530 and driven by gear to raise or lower frame 530. In addition, actuator assembly 575" includes one or more rollers 574", which are mounted to the opposed side of frame 530, to guide frame 530 when it is moved between its raised and lowered positions.

It should be understood that the frames described above may be raised or lowered by any number of actuator assemblies or actuators, including the actuator assemblies and actuators described above, or combination thereof.

Referring to FIGS. 25-29, the numeral 712 generally designates another embodiment of a patient repositioning apparatus. Patient repositioning apparatus 712 is configured to mount to a patient support 710, such as a hospital bed, stretcher, EMS cot, Operating Room (OR) table, or the like.

Similar to the previous embodiments, patient repositioning apparatus 712 includes a pair of sheet clamps 730 mounted to opposed sides of patient support 710 closer to the head end of patient support 710 than the foot end so that it generally aligns with the torso of the patient. In the illustrated embodiment, each sheet clamp 730 is mounted to patient support 710 by a four-bar mechanism 770, with the sheet clamps forming part of the four-bar mechanisms. In the illustrated embodiment, each four-bar mechanism 770 comprises a manually driven four-bar mechanism that is driven by a crank arm 772 with a handle 774. The fixed bar or link of each four-bar mechanism 770 is provided by a mount 776, for example a structural angle, that is mounted to patient support 710, for example, to the deck 714 that supports the mattress 722.

In the illustrated embodiment, each four-bar mechanism 770 includes two follower arms 778, which are pivotally mounted at their lower ends to mount 776 and are driven by crank arm 772. Sheet clamp 730 comprises a plate 782, which is pivotally mounted to the opposed upper ends of follower arms 778 to thereby form the four-bar mechanism.

As noted above, each four-bar mechanism 770 may be manually driven by crank arm 772, which includes a gear 784 that engages toothed portions 778*a*, 780*a* of follower arms 778, 780, respectively so that when handle 774 is pushed or pulled and crank arm 772 is rotated about is rotational axis 781 (in the counterclockwise direction as viewed in FIGS. 26 and 29), follower arms 778, 780 will rotate about their respective rotational axes 778*b*, 780*b* in a clockwise direction (as viewed in FIGS. 26 and 29) to thereby move clamp 730 in an arcuate path toward the head end of patient support 710.

Optionally, each four-bar mechanism 770 may include a crank arm 772, but the rotational shafts that rotatably couple the lower ends of each follower arm 778, 780 to its respective mount may be shared by the four-bar mechanism on the opposed side of the patient support so that both four-bar mechanisms may be operated from a single crank arm. However, it should be understood that the four-bar mechanisms may be independently driven, which would, however, require two operators to boost a patient. When independently driven, one of the four-bar mechanisms may, therefore, be used to assist in tilting a patient.

As best seen in FIGS. 26 and 27, each plate 782 of each sheet clamp 730 includes an elongated opening 790 and a plurality of cams 792 and associated lock plates 794, which are mounted about opening 790. The number of cams and lock plates may be varied. In the illustrated embodiment, cams 792 comprise wedge shaped cams that are pivotally mounted about an upper edge 790*a* of opening 790, while lock plates 794 are mounted on a lower edge 790*b* of opening 790. Optionally, cams 792 may be pivotally mounted to plate 782 by brackets 791, which locate the respective cams in recesses provided at upper edge 790*a* of opening 790.

In this manner, when a sheet is inserted into the opening 790 from the patient support facing side 730*a* of clamp 730, the cams 792 will pivot outwardly from the outwards facing side of clamp 730 so that the sheet can slide over lock plates 794 and be pulled through the opening 790 from the outwardly facing side 730*b* of each clamp 730*a*. Cams 792, however, grip the sheet tightly when the sheet is pulled in the other direction. Thus, when a sheet S is inserted into openings 790 and then four-bar mechanisms 770 are operated to raise clamps 730, the patient's weight on the sheet will cause the cams 792 to grip harder on the sheet as the load increases.

Optionally, cams 792 and/or lock plate 794 may include enhanced gripping surfaces formed thereon or applied thereto, such as ribs, ridges, knurling, or high friction material to thereby increase the performance of the clamps.

Accordingly, with the patient repositioning apparatus 710, a sheet that is under a patient may be pulled through sheet clamps 730 and held tightly while the four-bar mechanisms 770 are rotated so that the sheet is lifted and then moved toward the head end of the patient support 710. Similar to the previous embodiments, by lifting and then moving the sheet toward the head end, the shear on a patient's skin is reduced.

As noted above, four-bar mechanisms 770 are manually driven, but it should be understood, that gears 734 may be driven by a motor or another actuator. Furthermore, depending on the size of follower arms 778, 780, crank arms 772, and gear ratios, the amount of force to move a patient can be greatly reduced. For example, with a sufficient lever arm and gear ratio, the mechanism can move a patient who weighs 250 pounds with 20-lbs of effort. This allows a single caregiver to boost a patient with less effort, causing less stress than other conventional methods.

Referring to FIG. 24C, as noted above, any of the above the side rails or patient repositioning apparatuses may incorporate a quick release mechanism to allow the side rail (or patient repositioning apparatus) to lower quickly, for example, in the event of a "Code" situation where the side rails must be lowered very quickly so that caregivers have maximum access to the patient. For ease of description, reference will be made to a side rail application; however, it should be understood that the same or similar mechanism may be used for any of the above patient repositioning apparatuses that are mounted directly to the patient support.

Referring again to FIG. 24C, the numeral 926 generally designates a side rail for a patient support, such as a hospital bed. Side rail 926 includes a side rail body 934 and a mounting mechanism 936, which includes a pair of mounting arms 938. Mounting arms 938 are pivotally mounted at their upper ends to side rail body 934 and at their lower ends to an articulating deck for frame (which supports the deck) 914.

Optionally, one or more of the pivot connections 940 that mount the lower ends of the mounting arms to deck 914 may incorporate a quick release mechanism 980, which allows the side rail body 934 to be quickly lowered.

Referring to FIG. 24D, one or both lower pivot connections 940 of side rail mounting arms 938 may include a clutch 941 to allow the side rail body 934 to quickly pivot about pivot connection 940. Clutch 941 is mounted to a driven shaft 942 (e.g., a shaft driven by a motor mounted to deck or frame 914) and includes a fixed disc 944, which is fixedly mounted to driven shaft 942, and a floating disc 946, which is movably mounted to shaft 942 and fixedly mounted to side rail mounting arm 938, which together form the clutch 941. Each disc 944, 946 may comprise a gear disc with spaced teeth on their faces at their perimeters, which when mated together couple the two discs together and thereby drivingly couple the respective mounting arm to its associated driven shaft 942 for selective rotation with the driven shaft 942. This type of connection is often referred to as a hirth joint.

The slope (pressure angle) of the teeth on disc 944, 946 may be symmetrical so that the discs rigidly couple the side rail mounting arm 938 to the driven shaft 942 in both rotational directions (i.e., clockwise and counterclockwise). Alternately, the slope of the teeth may be asymmetrical, and further such that the slope on one side of the teeth allows the two discs to slip passed each other if a minimum threshold of a downward force is applied to side rail body 934. The slope on the other side is sufficiently steep to lock the two discs together unless the discs are separated, as described below. Therefore, it should be understood that the quick release mechanism may be configured as a slip joint at pivot connections 940 to allow the side rail body 934 to lower by simply applying sufficient downward force on the side rail body to allow the two discs to slip by each other.

As best seen in FIG. 24D, in one embodiment, quick release mechanism 980 includes an actuator 982 to separate the two discs. In the illustrated embodiment, actuator 982 comprises a cable 982*a*. When cable 982*a* is pulled, cable 982*a* separates disc 946 from disc 944. Cable 982*a* is coupled to disc 946 and is supported so that it can rotate with the disc 946 when the side rail body lowers. For example, cable 982*a* may include a bifurcated end 982*b* to couple to disc 946 radially outward from its central axis 940*a* at equidistant points from axis 940*a* and at points 180 degrees apart.

In this manner, when cable 982*a* is pulled (for example, by a handle provided on side rail body 934), discs 944 and 946 will separate to decouple side rail body 934 from the motive power of the motor that drives pivot connection 940. It should be understood that one or both pivot connections 940 may be driven and include quick release mechanism 980.

Referring to FIG. 24E, the numeral 1080 designates another embodiment of a quick release mechanism. Quick release mechanism 1080 includes a frame or housing 1080*a*, which is coupled to disc 946, and a spring 1080*b* that is mounted about shaft 942 and captured between a shoulder 1080*c* formed or provided in frame 1080*a* and a shoulder 942*a* formed or provided on shaft 942. In this manner, when frame 1080*a* is pushed toward disc 944, spring 1080*b* will compress. When frame 1080*a* is released, spring 1080*b* will urge disc 946 to separate from disc 944. To urge frame 1080*a* and disc 946 toward disc 944 to engage disc 944, quick release mechanism 1080 includes an actuator 1082.

In the illustrated embodiment, actuator 1082 includes a threaded shaft 1082*a* and a handle 1082*b*, which is coupled to shaft 1082*a*. Shaft 1082*a* is supported in side rail body 934 by a bracket 1082*c* with a threaded opening 1082*d*, through which shaft 1082*a* extends to engage and push on the end of frame 1080*a*. Thus, when handle 1082*b* is turned in the clockwise direction, for example, as viewed in FIG. 24E, shaft 1082*a* will urge frame 1080*a* toward disc 944 so that discs 946 and 944 will be engaged. When discs 944 and 946 are engaged, side rail body 934 is coupled to the motive power of the motor (or motors) that drives one or both pivot connections 940. When handle 1082*b* is turned in the opposite direction, for example, in the counterclockwise direction as viewed in FIG. 24E, spring 1080*b* will urge frame 1080*a* to the right as viewed in FIB. 24E so that disc 946 will separate from disc 944 with a sufficient distance to disengage the two discs 944, 946 from each other.

It should be understood that, alternately, the spring may be mounted relative to disc 946 so that spring 1080*b* urges disc 946 into engagement with disc 944. In this configuration, frame 1080*a* is decoupled from disc 946 and configured to compress or reduce the spring force applied by spring 1080*b* on disc 946 to allow the two discs to slip when a downward sufficient force is applied to the side rail body. Again, the position of frame 1080*a* can be controlled by actuator 1082.

Referring to FIG. 24F, the numeral 1182 designates another embodiment of an actuator that may be used to urge frame 1080*a* (with or without disc 946 as noted above in reference to the modification noted above) toward disc 944. In the illustrated embodiment, actuator 1082 comprises a cam actuator with a cam disc or body 1182*a* that is adjacent to the end of frame 1080*a*. Cam disc 1182*a* is mounted for rotation about a rotational axis 1182*b* offset from the center of the disc and is driven about axis 1182*b* either manually or by a powered actuator. For example, a manual actuator may include a handle that is mounted to cam disc and accessible at side rail body 934 for use by a caregiver. A powered actuator may include a motor and gear that engage the cam disc, for example, engages gear teeth mounted to the perimeter of cam disc 1182 or to a cylindrical member 1182*c* mounted to cam disc 1182*a* about axis 1182*b*.

In this manner, as cam disc 1182*a* is driven about axis 1182*b*, cam disc 1182*a* will push on frame 1080*a* to thereby either push disc 946 toward disc 944 against the spring force of spring 1080*b* or will increase the spring force applied by spring 1080*b* on disc 946 to urge disc 946 toward disc 944 (in the modified version described above). If the cam disc 1182*a* is rotated in the opposed direction so that it moves away from disc 944, spring 1080*b* will either push on frame 1080*a* to pull disc 946 away from disc 944 or the spring force exerted by spring 1080*b* on disc 946 will be reduced to allow the two discs to slip when sufficient downward force is applied to the side rail body 934 (as described above in reference to the modified version of quick release 1080).

It should be understood that any of the quick release mechanisms described above, and shown in FIGS. 24D-24F, may be used to decouple frames 430, 530 from the motive force of the motors that drive the frames 430, 530 up and/or down.

In any of the above, patient positioning apparatuses, the surface or surfaces (and other surfaces) that contact the sheet may be cleared by on board methods or by extend methods. For example, any of the surfaces of the patient repositioning apparatuses that make contact with or could make contact with bodily fluids or the like may incorporate antimicrobial additives, such as Microban. For example, the antimicrobial additives may be applied to coatings on the various surfaces or may be incorporated into the material forming the surface, such as disclosed in U.S. patent application Ser. No. 13/673,393, entitled MEDICAL EQUIPMENT WITH ANTIMICROBIAL COMPONENTS AND/OR SYSTEM, which is commonly owned by Stryker Corporation of Kalamazoo Michigan and incorporated by reference herein in its entirety.

In other embodiments (or in addition), UV light may be used to clean the patient repositioning apparatuses. In the case of patient repositioning apparatus that are built-in to the side rails, the side rails may incorporate one or more UV lights, such as UV LED lights, that are powered and controlled by a bed-based control and power supply system. Further, the powered actuators described above may be powered and controlled by a bed-based control and power supply system, and optionally controlled by user input devices, such as buttons, located on the side rail or user input devices located the headboard or footboard.

A suitable method of use of some of the patient positioning apparatuses described herein includes lowering the side rail to a location so the clamping device or clamps are at appropriate level for engaging a sheet supported on the mattress. The sheet is then engaged by a clamping device. Side rails on both sides are raised to a higher position to thereby lift or at least reduce the weight (or immersion) of the patient on the patient support surface. The side rails are then further moved to pull on the sheet to boost the patient. After the patient is boosted, the side rails then can be lowered to gently lower the patient back on to the patient support surface. The sheet at that point can then be released from the clamps. The patient reposition apparatuses, as noted, may also be used to the tilt or assist in tilting the patient by operating just one side of the apparatus.

The above description is that of various embodiments of the invention. Alterations and changes can be made without departing from the spirit and broader aspects of the invention as defined in the appended claims, which are to be interpreted in accordance with the principles of patent law including the doctrine of equivalents. This disclosure is presented for illustrative purposes and should not be interpreted as an exhaustive description of all embodiments of the invention or to limit the scope of the claims to the specific elements illustrated or described in connection with these embodiments. For example, and without limitation, any individual element(s) of the described invention may be replaced by alternative elements that provide substantially similar functionality or otherwise provide adequate operation. This includes, for example, presently known alternative elements, such as those that might be currently known to one skilled in the art, and alternative elements that may be developed in the future, such as those that one skilled in the art might, upon development, recognize as an alternative. Further, the disclosed embodiments include a plurality of features that are described in concert and that might cooperatively provide a collection of benefits. The present invention is not limited to only those embodiments that include all of these features or that provide all of the stated benefits, except to the extent otherwise expressly set forth in the issued claims. Any reference to claim elements in the singular, for example, using the articles "a," "an," "the" or "said," is not to be construed as limiting the element to the singular.

We claim:

1. A patient handling system comprising: a patient support apparatus having a patient support surface, said patient support surface having a head end and a foot end and opposed sides extending between said head end and said foot end; and the patient support apparatus including a patient repositioning apparatus mounted to a component of the patient support apparatus adjacent each of said opposed sides of said patient support surface, each of said patient repositioning apparatuses having a clamp configured to releasably engage a sheet positioned on said patient support apparatus, and said patient repositioning apparatuses operably supported by the patient support apparatus, said patient repositioning apparatuses operable to move in an arcuate path both upwardly and toward the head end at the same time to move said clamps upwardly relative to said patient support surface and the component of the patient support apparatus and toward said head end of said patient support surface with sufficient force to partially lift an adult person supported on the sheet with respect to a region of the adult person between a head end and a foot end of the adult person and extending from a left side to a right side of the adult person, wherein when the sheet is engaged by said clamps the sheet and the adult person supported thereon can be partially raised off said patient support surface and moved to toward said head end of said patient support surface.

2. The patient handling system according to claim 1, wherein said patient repositioning apparatuses are operable to move said clamps in said arcuate paths adjacent said sides of said patient support apparatus.

3. The patient handling system according to claim 1, further comprising force generating devices, said force generating devices operable to generate sufficient force with said patient repositioning apparatuses to lift the adult person supported on the sheet partially off said patient support surface.

4. The patient handling system according to claim 3, wherein said force generating devices comprise springs.

5. The patient handling system according to claim 3, wherein said force generating devices operable to generate sufficient force with said patient repositioning apparatuses to lift a sacral region of the adult person supported on the sheet off said patient support surface.

6. The patient handling system according to claim 1, further comprising a pair of side rails, and said patient repositioning apparatuses being mounted adjacent said side rails.

7. The patient handling system according to claim 1, further comprising a pair of side rails, and said patient repositioning apparatuses being mounted to said side rails.

8. The patient handling system according to claim 7, wherein said side rails are mounted for rotational movement relative to said patient support surface.

9. The patient handling system according to claim 8, further comprising force generating devices, said force generating devices operable to move said side rails in said arcuate path with said sufficient force to lift the adult person supported on the sheet partially off said patient support surface.

10. The patient handling system according to claim 9, wherein each of said clamps comprises a movable frame mounted to a respective side rail of said pair of side rails, and said movable frame is movably mounted for movement from a non-clamping position to a clamping position.

11. A patient handling system comprising: a patient support apparatus having a patient support surface, said patient support surface having a head end, a foot end, a longitudinal axis, and opposed sides extending between said head end and said foot end and extending parallel to said longitudinal axis; and a patient repositioning apparatus mounted to a component of the patient support apparatus adjacent each of said opposed sides of said patient support surface, each of said patient repositioning apparatuses having a clamp configured to releasably engage a sheet positioned on said patient support apparatus, each of said patient repositioning apparatuses operable to move in an arcuate path adjacent said opposed sides to move said clamp both at the same time 1) upwardly in a substantially vertical plane relative to said patient support surface and the component of the patient support apparatus and 2) toward said head end of said patient support surface parallel to the longitudinal axis of the patient support apparatus, wherein said clamps of said patient repositioning apparatuses are movable to partially lift an adult person supported on the sheet with respect to a region of the adult person between a head end and a foot end of the adult person and extending from a left side to a right side of the adult person.

12. The patient handling system according to claim 11, further comprising force generating devices, said force generating devices operable to generate sufficient force with said patient repositioning apparatuses to lift the adult person supported on the sheet partially off said patient support surface.

13. The patient handling system according to claim 12, wherein said force generating devices comprise springs.

14. The patient handling system according to claim 11, further comprising a pair of side rails, and said clamps being mounted to said side rails.

15. The patient handling system according to claim 14, wherein said clamps are movably mounted to said side rails.

16. The patient handling system according to claim 15, wherein said clamps are movably mounted to said side rails on linear paths.

17. The patient handling system according to claim 14, wherein said side rails are further mounted for linear movement relative to said opposed sides of said patient support surface.

18. The patient handling system according to claim 14, further comprising force generating devices, said force generating devices operable to move said side rails in said arcuate path with sufficient force to lift the adult person supported on the sheet partially off said patient support surface.

19. The patient handling system according to claim 18, wherein said force generating devices are operable to move said side rails with said sufficient force to lift a sacral region of the adult person supported on the sheet off said patient support surface.

20. The patient handling system according to claim 14, wherein said side rails each include a side rail body and a pair of mounting arms rotatably mounting said side rail bodies relative to said patient support surface, and said clamps configured to clamp the sheet against said side rail bodies.

* * * * *